US012186251B2

(12) United States Patent
Watkins

(10) Patent No.: US 12,186,251 B2
(45) Date of Patent: Jan. 7, 2025

(54) HEAD AND NECK CRADLE

(71) Applicant: Joshua Michael Watkins, Woodstock, GA (US)

(72) Inventor: Joshua Michael Watkins, Woodstock, GA (US)

( * ) Notice: Subject to any disclaimer, the term of this patent is extended or adjusted under 35 U.S.C. 154(b) by 303 days.

(21) Appl. No.: 17/864,392

(22) Filed: Jul. 13, 2022

(65) Prior Publication Data

US 2023/0016803 A1 Jan. 19, 2023

Related U.S. Application Data

(60) Provisional application No. 63/221,458, filed on Jul. 13, 2021.

(51) Int. Cl.
*A61G 7/05* (2006.01)
*A61G 7/07* (2006.01)

(52) U.S. Cl.
CPC .................................... *A61G 7/072* (2013.01)

(58) Field of Classification Search
CPC . A61G 7/00; A61G 7/05; A61G 7/065; A61G 7/072
See application file for complete search history.

(56) References Cited

U.S. PATENT DOCUMENTS 7,036,168 B1 * 5/2006 Knickerbocker ...... A61G 13/12 5/636
8,370,976 B2 * 2/2013 Matt .................... A47C 20/026 5/643

* cited by examiner

*Primary Examiner* — Fredrick C Conley
(74) *Attorney, Agent, or Firm* — Incorporating Innovation LLC; Charlena Thorpe, Esq.

(57) ABSTRACT

Implementations of a head and neck cradle comprise an upper platform, a middle platform (or middle portion), and a lower platform. In some implementations, a method of using the head and neck cradle comprises placing the lower platform under a hospital bed mattress such that the upper platform rests adjacent to the end of the mattress and extends away from the hospital bed, and may further comprise placing a patient in a prone position on the hospital bed mattress with the patient's head placed on the upper platform.

9 Claims, 36 Drawing Sheets

| Parts List | | |
|---|---|---|
| Item | Qty | Description |
| #1 | 2 | 1-1/2"x2-1/2"x1/4" Steel w/ 1/4" hole |
| #2 | 2 | 1-1/2"x4-1/2"x1/4" Steel w/ 3"x1/4" Groove |
| #3 | 2 | 1-1/2"x8"x1/4" Flat |
| #4 | 2 | 1-1/2"x10"x1/4" w/ Hole and Groove |
| #5 | 2 | 1-1/2"x11"x1/4" Steel |
| #6 | 4 | 1-1/2" sq x 2-1/2" x 14ga w/ 3 holes |
| #7 | 2 | 1-1/4" sq x 5" x 16ga Insert |

200
(200A)

200
(200A)

10

200
(200A)

200
(200A)

200 (200A)

10

200 (200A)

200 (200A)

200 (200A)

10

200
(200A)

200
(200A)

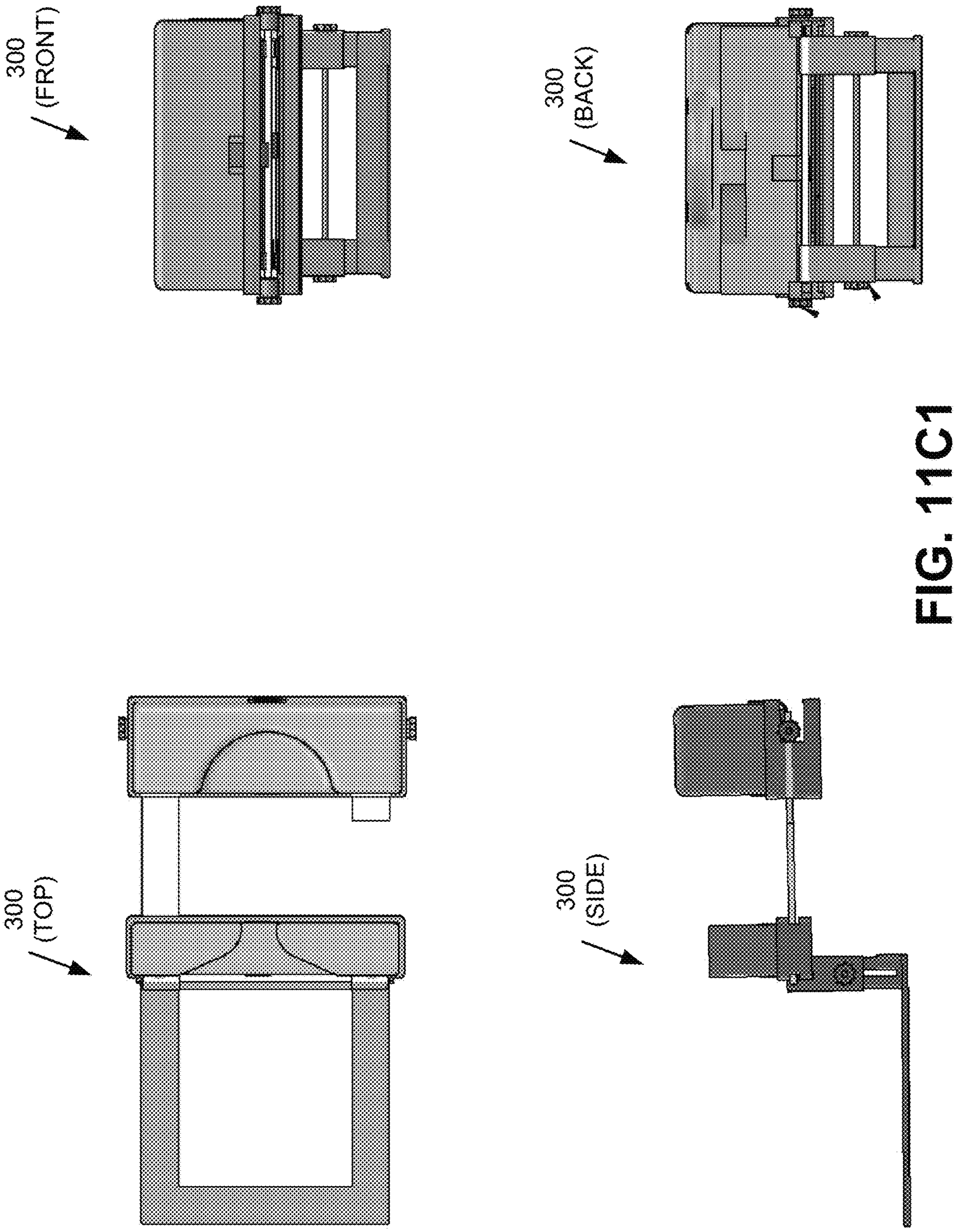
FIG. 11C1

FIG. 11C2

HEAD AND NECK CRADLE

CROSS REFERENCE TO RELATED APPLICATION

This application claims the benefit of U.S. Patent Application Ser. No. 63/221,458, which was filed on Jul. 13, 2021, and is incorporated herein by reference in its entirety.

TECHNICAL FIELD

This disclosure relates to implementations of a head and neck cradle.

BACKGROUND

Proning is the act of placing a patient in a downward facing and/or face-down prone position such as shown in FIG. 1A. Sometimes, patients are placed in such prone position during mechanical ventilation such as shown in FIG. 1B. This is referred to as prone ventilation or prone positioning. However, monitoring a patient in the prone position can be difficult. Also, prone positioning can cause facial bruising and endotracheal tube displacement, including accidental extubation, among other problems.

BRIEF DESCRIPTION OF THE DRAWINGS

FIGS. 11A-11E illustrate another implementation of an example head and neck cradle according to the present disclosure.

DETAILED DESCRIPTION

Implementations of a head and neck cradle are provided. In some implementations, the head and neck cradle comprises an upper platform, a middle platform (or middle portion), and a lower platform.

In some implementations, the head and neck cradle is configured to allow monitoring of a patient in a prone position with less or no difficulty, such as with less or no difficulty seeing and/or accessing the patient's head and/or face.

In some implementations, the head and neck cradle is configured to allow a patient to be kept in a prone position while reducing or preventing facial bruising or similar harm.

In some implementations, the head and neck cradle is configured to allow a patient to be kept in a prone position while reducing or preventing endotracheal tube displacement such as accidental extubation.

In some implementations, the head and neck cradle is configured to allow a patient to be kept in a prone position while reducing or preventing other typical problems from proning.

In some implementations, the head and neck cradle is configured such that the part of the head and neck cradle, such as the lower platform, can be placed under a hospital bed mattress. In some implementations, the head and neck cradle is configured to thereby permit another part of the head and neck cradle, such as the upper platform, to rest adjacent to the end of the hospital bed mattress for resting a patient's head on the head and neck cradle.

In some implementations, the head and neck cradle may be configured to be adjustable for the head size of a patient.

In some implementations, the head and neck cradle may be configured to be adjustable in height.

In some implementations, the head and neck cradle is configured to be portable.

In some implementations, the head and neck cradle is configured to be reusable. For example, in some implementations, one or more components of the head and neck cradle can be cleaned (e.g., disinfected) and reused or can be discarded and replaced to allow the head and neck cradle to be reused multiple times and/or by multiple users.

In some implementations, the head and neck cradle may be configured to be used reversibly. For example, in some implementations, the lower platform and the upper platform can be interchangeably placed under a hospital bed mattress and positioned adjacent to the end of the hospital bed mattress respectively to use the head and neck cradle reversibly.

In some implementations, a method of using the head and neck cradle comprises placing the lower platform under a hospital bed mattress such that the upper platform rests adjacent to the end of the mattress and extends away from the hospital bed. In some implementations, the method comprises placing a patient in a prone position on the hospital bed mattress with the patient's head placed on the upper platform.

Figure 1A:
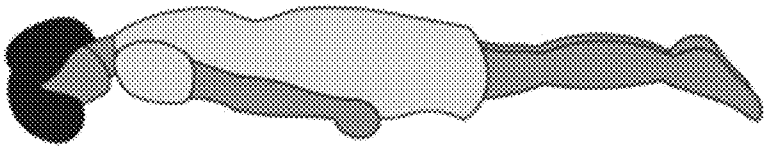
FIG. 1A (PRIOR ART)
FIGS. 1A and 1B illustrates existing examples of proning a medical patient.
Figure 1B:
FIG. 1B (PRIOR ART)
Figure 2A:
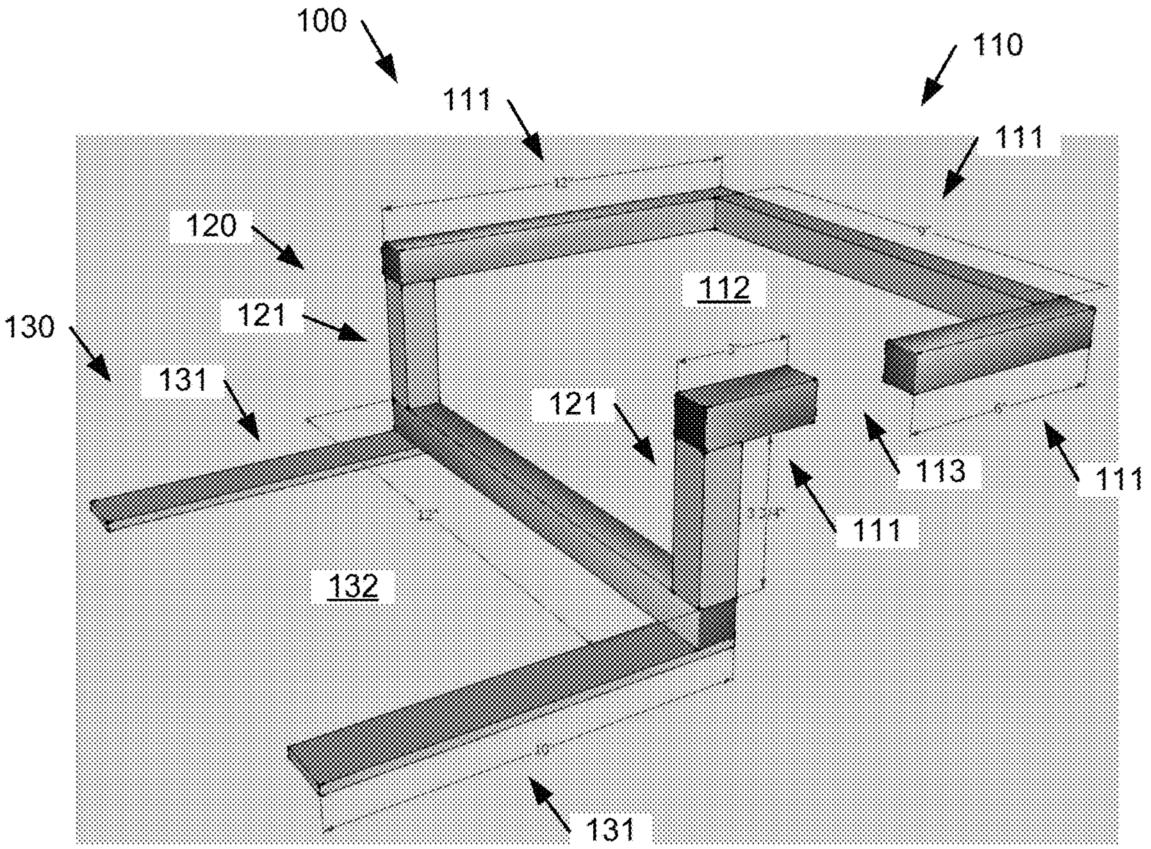
FIGS. 2A-2E illustrate an implementation of an example head and neck cradle according to the present disclosure.
Figure 2B:
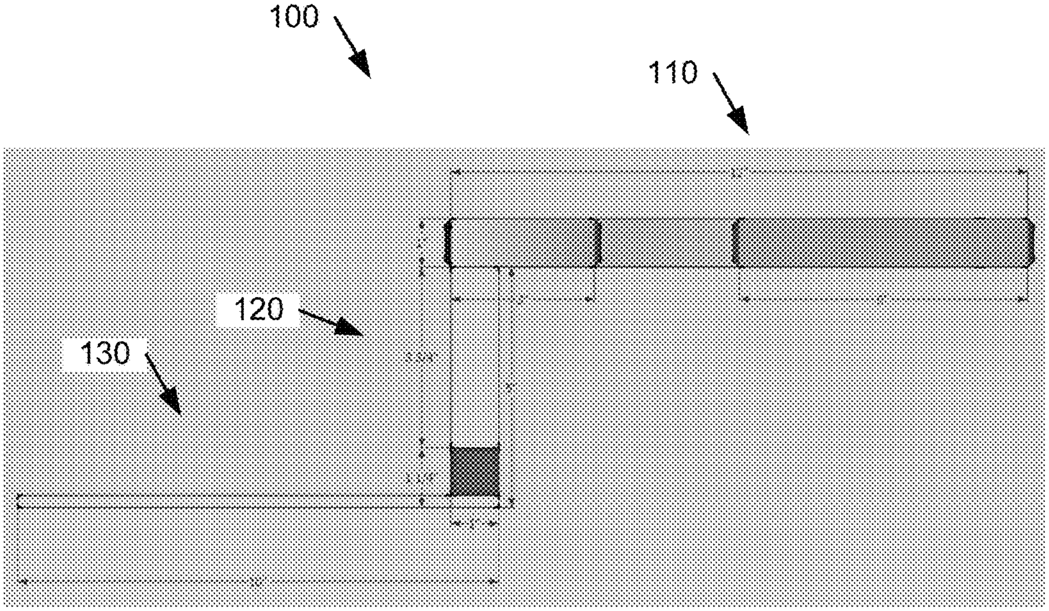
Figure 2C:
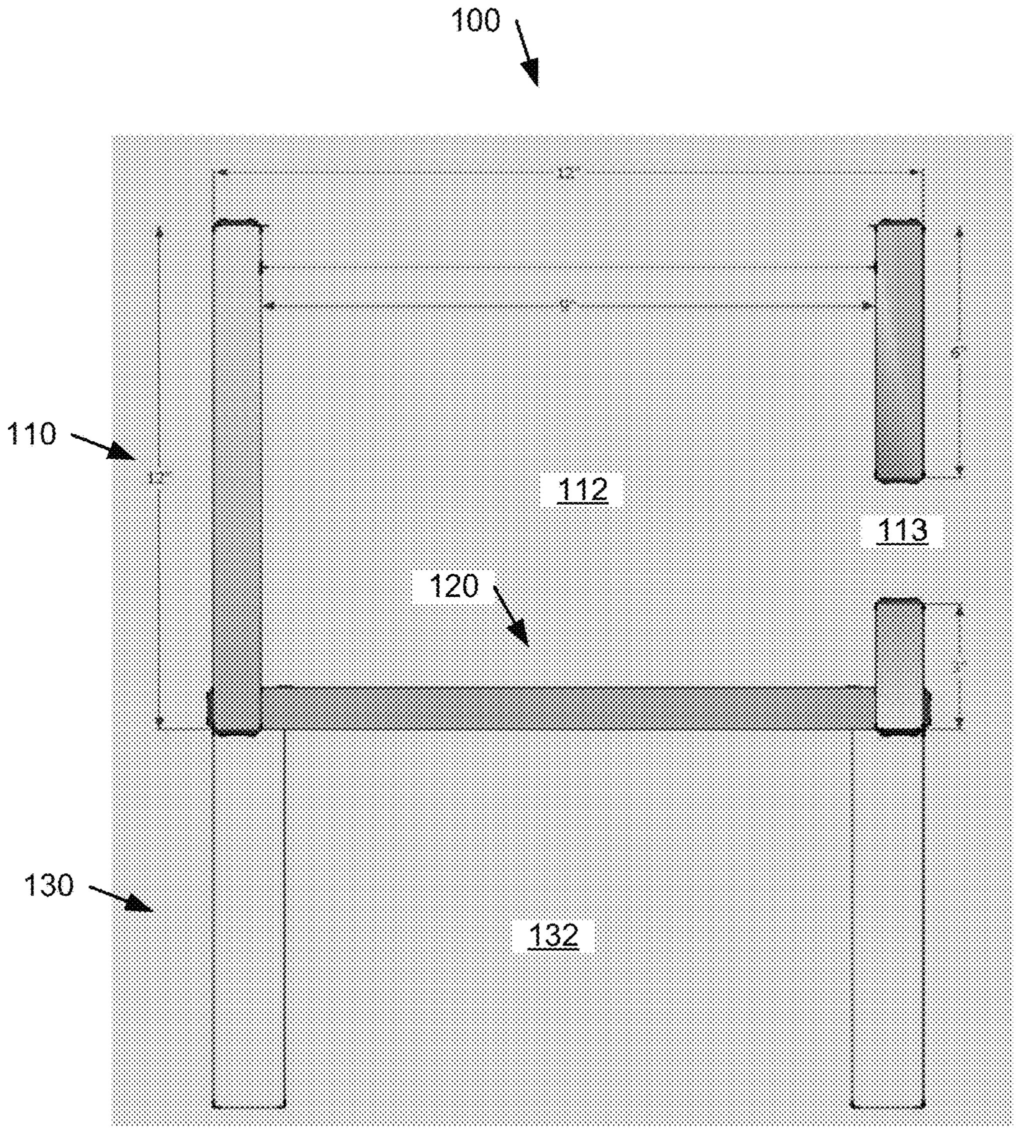

FIGS. 2A-2E illustrate an implementation of an example head and neck cradle 100 according to the present disclosure. As shown in FIGS. 2A and 2B, in some implementations, the head and neck cradle 100 comprises an upper platform 110, a middle platform (or middle portion) 120, and a lower platform 130.

Figure 2D:
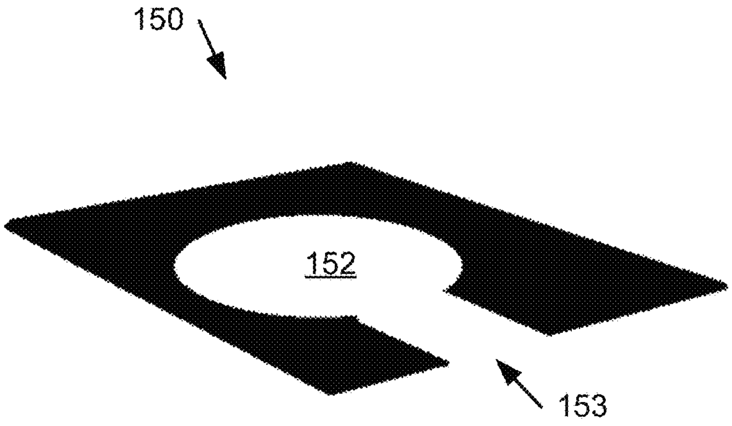
Figure 2E:
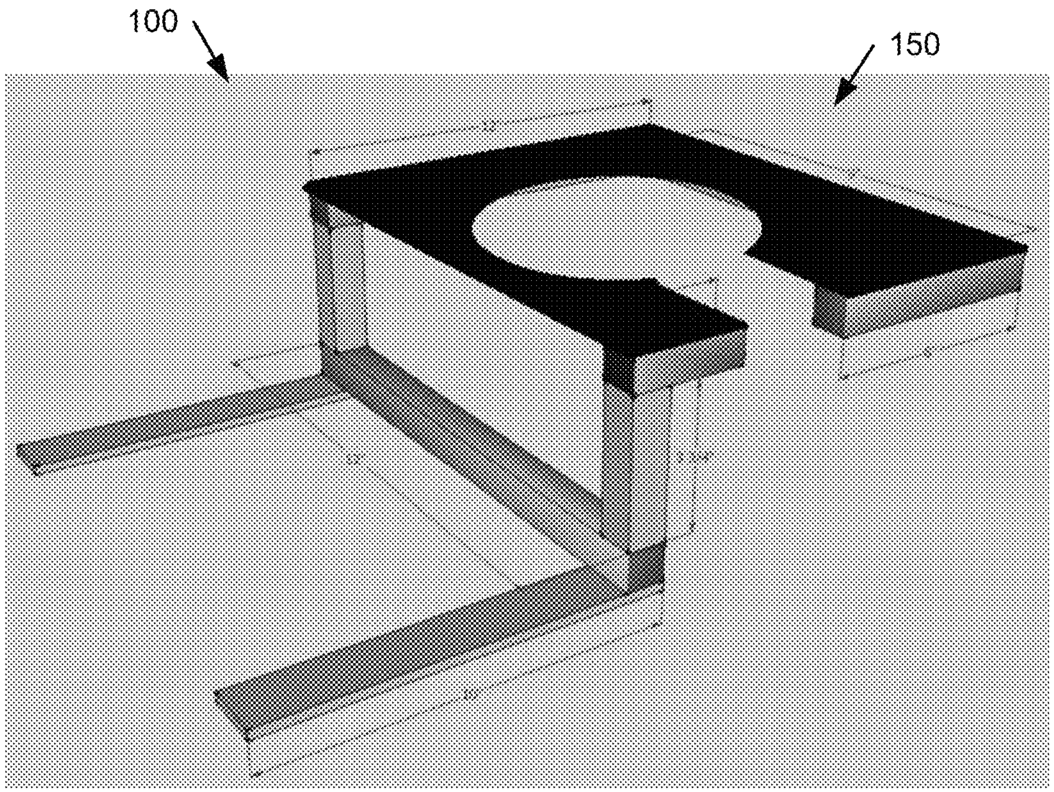

As shown in FIGS. 2D and 2E, in some implementations, the head and neck cradle 100 may further comprise a pad 150.

As shown in FIG. 2A, in some implementations, the upper platform 110 comprises a plurality of members 111. In some implementations, the upper platform 110 comprises an opening 112 through the middle of the upper platform 110 and an opening 113 through a side of the upper platform 110.

In some implementations, the members 111 may be any suitable size and shape to form the upper platform 110. For example, as shown in FIG. 2A, in some implementations, the members 111 may be generally rectangular prism shaped.

In some implementations, the openings 112, 113 may be any suitable size and shape. For example, as shown in FIG. 2A, in some implementations, the openings 112, 113 may be generally rectangular shaped.

As shown in FIG. 2A, in some implementations, the upper platform 110 extends in a first direction. In some implementations, the members 111 form the upper platform 110 by extending in a plane in the first direction.

In some implementations, the upper platform 110 may be adjustable such that the size of the middle opening 112 and/or the side opening 113 is adjustable.

As shown in FIG. 2A, in some implementations, the lower platform 130 comprises a plurality of members 131. In some implementations, the lower platform 130 comprises an opening 132 through the middle of the lower platform 130.

In some implementations, the members 131 may be any suitable size and shape to form the upper platform 110. For example, as shown in FIG. 2A, in some implementations, the members 131 may be generally rectangular prism shaped.

In some implementations, the opening 132 may be any suitable size and shape. For example, as shown in FIG. 2A, in some implementations, the opening 132 may be generally rectangular shaped.

As shown in FIG. 2A, in some implementations, the lower platform 130 extends in a second direction that is opposite to the extending of the upper platform 110 in the first direction. In some implementations, the members 131 form the lower platform 130 by extending in a plane in the second direction.

In some implementations, the lower platform 130 may be adjustable such that the size of the opening 132 is adjustable.

As shown in FIG. 2A, in some implementations, the middle portion 120 comprises a plurality of members 121. In some implementations, the middle portion 120 comprises an opening 122 through the middle of the middle portion 120.

In some implementations, the members 121 may be any suitable size and shape to form the middle portion 120. For example, as shown in FIG. 2A, in some implementations, the members 121 may be generally rectangular prism shaped.

In some implementations, the opening 122 may be any suitable size and shape. For example, as shown in FIG. 2A, in some implementations, the opening 122 may be generally rectangular shaped.

As shown in FIG. 2A, in some implementations, the middle portion 120 extends in a third direction such that the middle portion 120 connects the upper platform 110 on one side to the lower platform 130 on one side. In some implementations, the members 121 form the middle portion 120 by extending in a plane in the third direction.

In some implementations, the middle portion 120 may be adjustable such that the distance between the upper platform 110 and the lower platform 130 is adjustable.

As shown in FIGS. 2D and 2E, in some implementations, the pad 150 comprises an opening 152 through the middle of the pad 150 and an opening 153 extending through a side of the pad 150.

In some implementations, the pad 150 may be any suitable size and shape. For example, as shown in FIG. 2E, in some implementations, the pad 150 is dimensioned to be placed on top of the upper platform 110.

Figure 3:
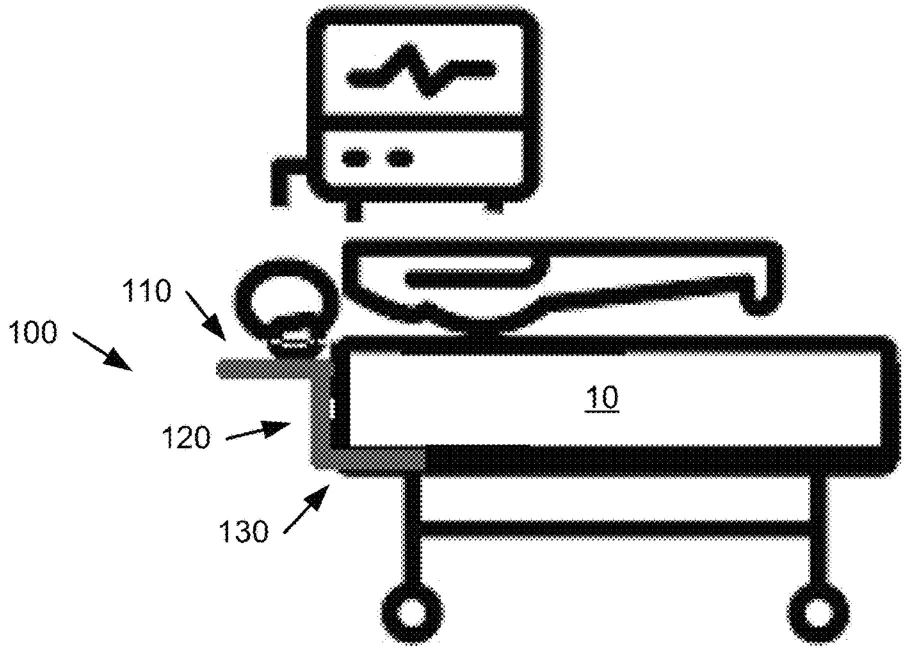
FIG. 3 illustrates an example use of the head and neck cradle according to the present disclosure.

As shown in FIG. 2E, in some implementations, the openings 152, 153 through the pad 150 correspond, e.g. in position, size, etc., to the openings 112, 113 through the upper platform 110. In this way, in some implementations, when any suitable user (herein, a "patient") places his or her head on the pad 150 positioned on the upper platform 110 in a prone position, such as shown in FIG. 3, the patient can be observed through the openings 152, 112.

Furthermore, in this way, in some implementations, the opening 153, 113 through the side of the pad 150 and the upper platform 110 respectively helps to position and adjust any tubes (such as for ventilation) and/or other equipment extending from the patient.

In some implementations, the pad 150 may be adjustable such that the size of the middle opening 152 and/or the side opening 153 is adjustable.

As shown in FIGS. 2A and 2B, in some implementations, the head and neck cradle 100 is generally Z-shaped. For example, as described above, in some implementations, the upper platform 110 extends in a first direction, the lower platform 130 extends in a second direction generally opposite to the first direction, and the middle portion 120 extends in a third direction from one side of the upper platform 110 to one side of the lower platform 130.

Furthermore, as shown in FIGS. 2A and 2B, in some implementations, the upper platform 110 and the lower platform 130 extend in separate, generally parallel planes, extending in generally opposite directions, and the middle portion 120 extends in a plane generally perpendicular to the planes of the upper platform 110 and the lower platform 130. In some implementations, when the head and neck cradle 100 is used, the upper platform 110 and the lower platform 130 extend generally horizontal and the middle portion 120 extends generally vertical.

In some implementations, the head and neck cradle 100 may be any suitable shape. In some implementations, the head and neck cradle 100 may be any suitable size.

In some implementations, the upper platform 110, lower platform 130, and middle portion 120 may be positioned in any other suitable configuration.

As shown in FIG. 3, in some implementations, the head and neck cradle 100 is configured such that the lower platform 130 can be placed under any suitable mattress of any suitable bed (herein, a "hospital bed mattress") 10. In some implementations, the head and neck cradle 100 is configured to thereby permit the upper platform 110 to rest adjacent to the end of the hospital bed mattress 10 for resting a patient's head on the upper platform 110.

In this way, in some implementations, a portion of a patient's face and any equipment extending from the patient's face can be positioned through the openings 112, 113 of the upper platform 110 when using the head and neck cradle 100. Furthermore, in some implementations, a portion of the patient's face and any equipment extending from the patient's face can be positioned through the openings 152, 153 of the pad 150 when included on the head and neck cradle 100.

In some implementations, the head and neck cradle 100 is configured to allow monitoring of a patient in a prone position with less or no difficulty, such as with less or no difficulty seeing and/or accessing the patient's head and/or face.

In some implementations, the head and neck cradle 100 is configured to allow a patient to be kept in a prone position while reducing or preventing facial bruising or similar harm.

In some implementations, the head and neck cradle 100 is configured to allow a patient to be kept in a prone position while reducing or preventing endotracheal tube displacement such as accidental extubation.

In some implementations, the head and neck cradle 100 is configured to allow a patient to be kept in a prone position while reducing or preventing other typical problems from proning.

In some implementations, the head and neck cradle 100 is configured to be used as an off-the-bed head cradle.

In some implementations, the head and neck cradle 100 is configured to be portable.

In some implementations, the head and neck cradle 100 is configured to be reusable. For example, in some implementations, one or more components of the head and neck cradle 100, such as the upper platform 110, can be cleaned (e.g., disinfected) and reused to allow the head and neck cradle 100 to be reused multiple times and/or by multiple users.

In some implementations, one or more components of the head and neck cradle 100, such as the pad 150, can be discarded and replaced to allow the head and neck cradle 100 to be reused multiple times and/or by multiple users.

In some implementations, the head and neck cradle 100 may be configured to be reversible. For example, as shown in FIGS. 4A and 5A, in some implementations, the lower platform 130 and the upper platform 110 are configured to be interchangeably placed under a hospital bed mattress and positioned adjacent to the end of the hospital bed mattress respectively to use the head and neck cradle 100 reversibly.

In some implementations, the head and neck cradle 100 may be configured to include a pad 150 or similar padding, such as shown in FIGS. 2E and 6A-6D. In some implementations, the head and neck cradle 100 may be configured to be used without a pad 150 (cushion, pillow) or similar or other padding or cushioning, such as shown in FIGS. 2A, 4A, and 5A.

Figure 4A:
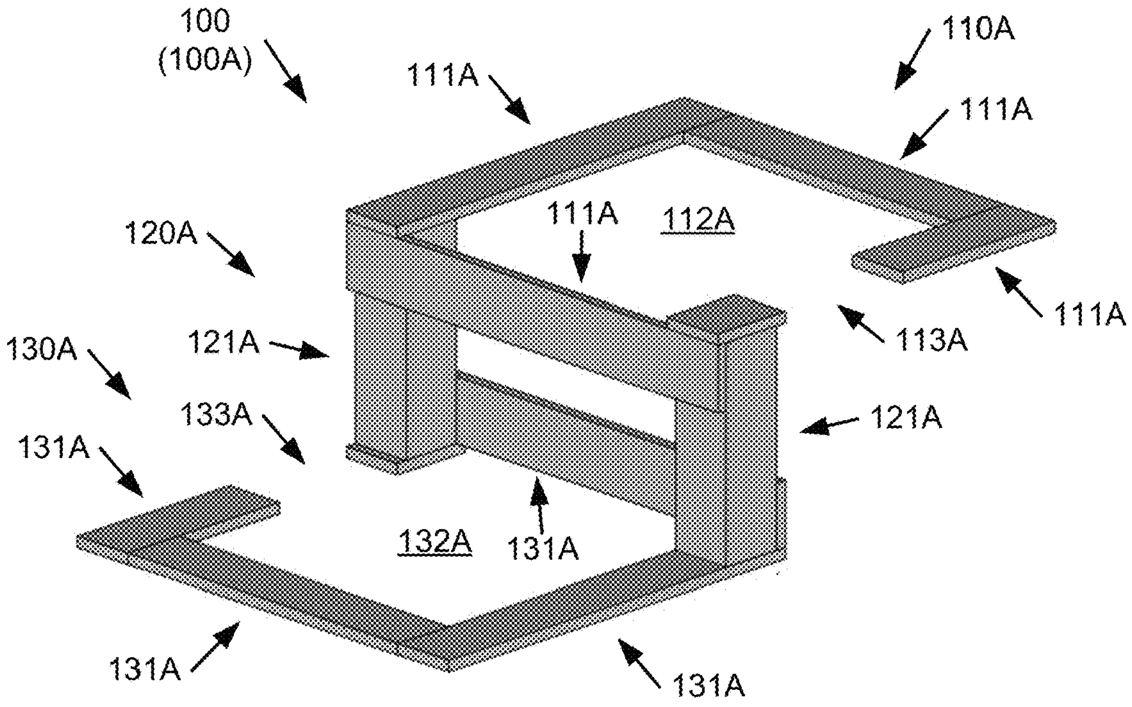
FIGS. 4A-4C illustrate another implementation of an example head and neck cradle according to the present disclosure.
Figure 5A:
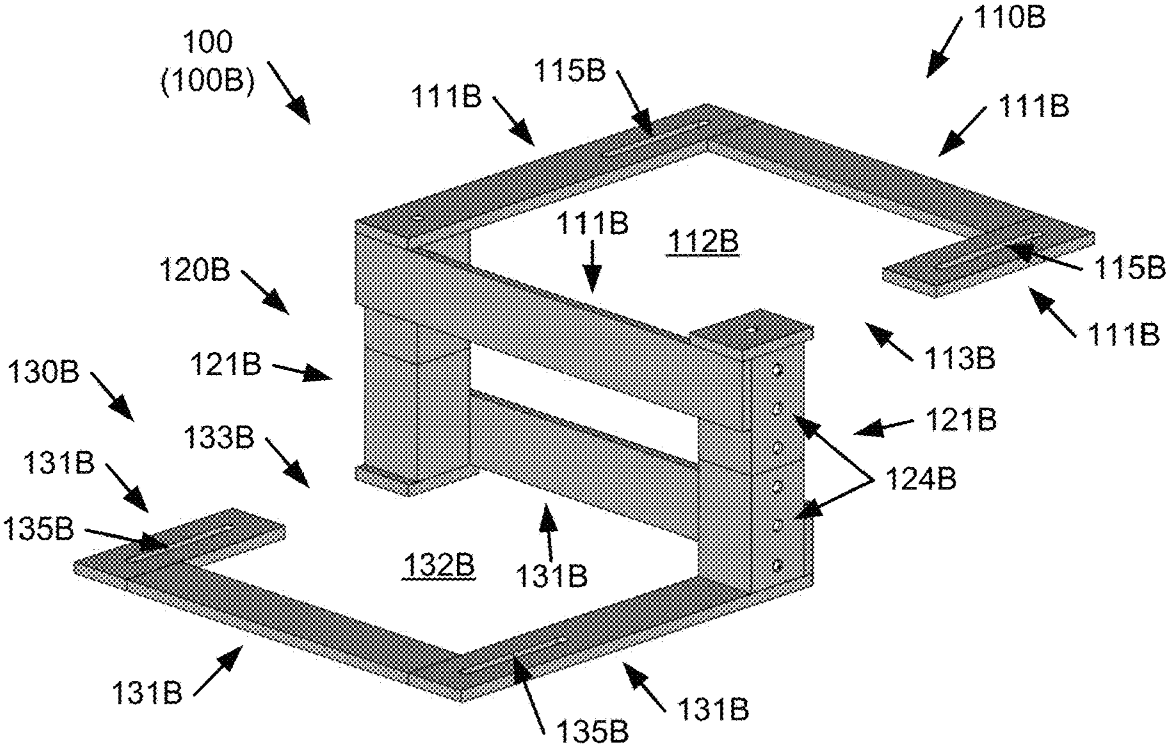
FIGS. 5A-5I illustrate another implementation of an example head and neck cradle according to the present disclosure.
Figure 5B:
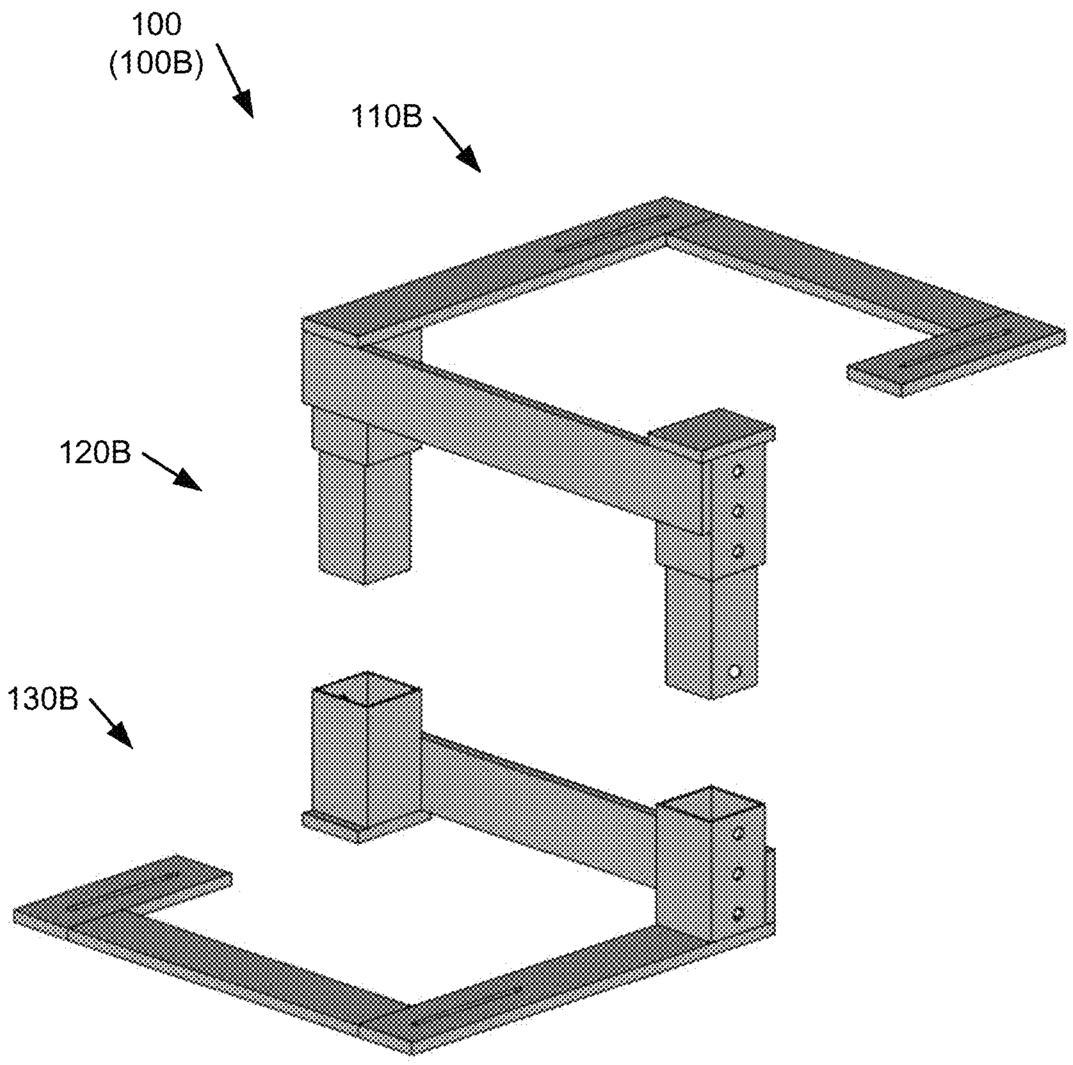
Figure 5C:
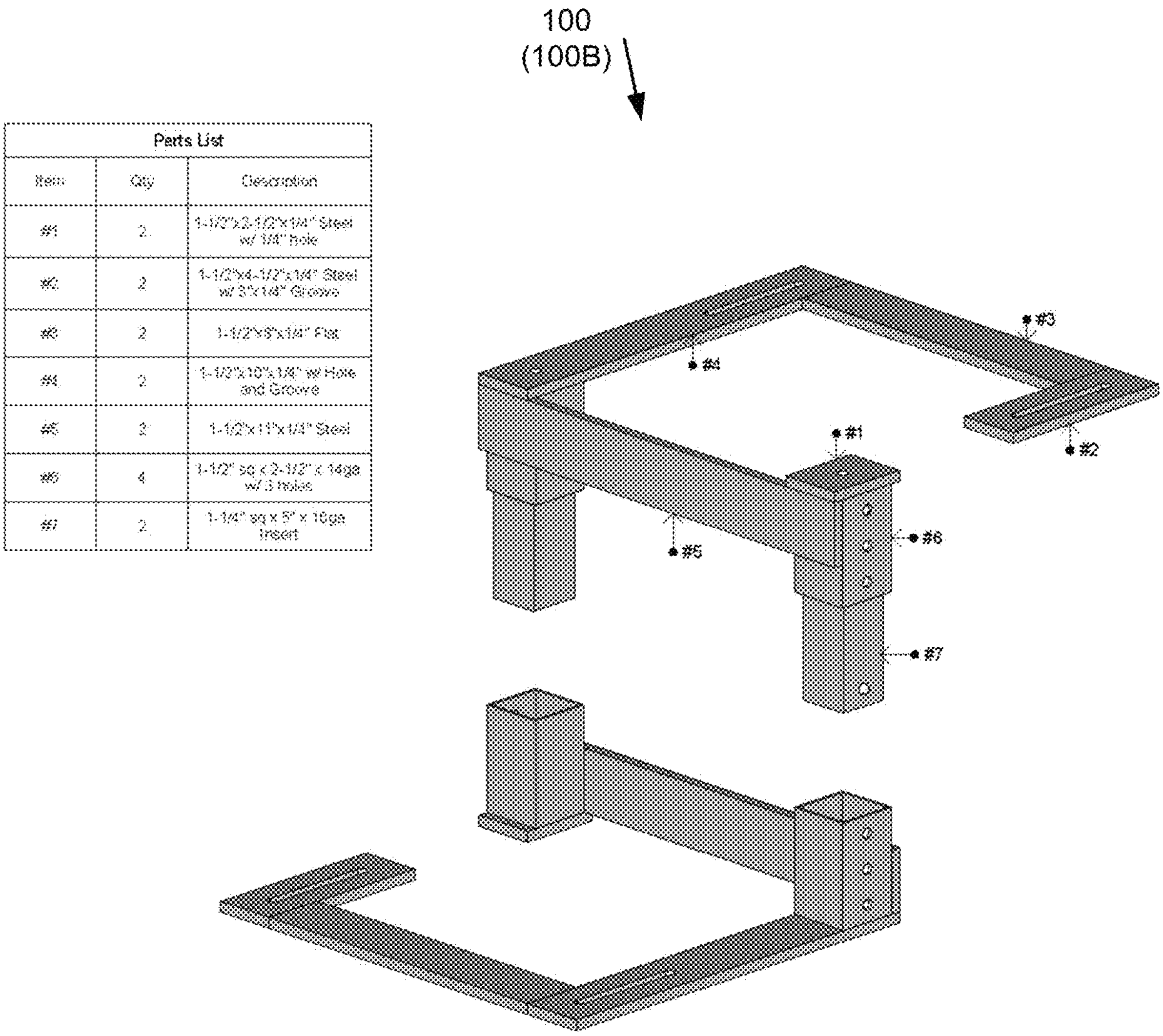
Figure 5D:
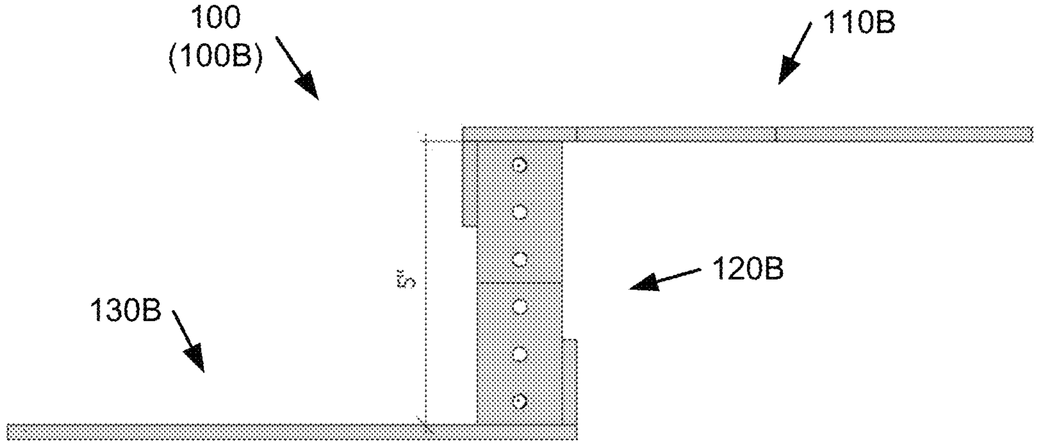
Figure 5E:
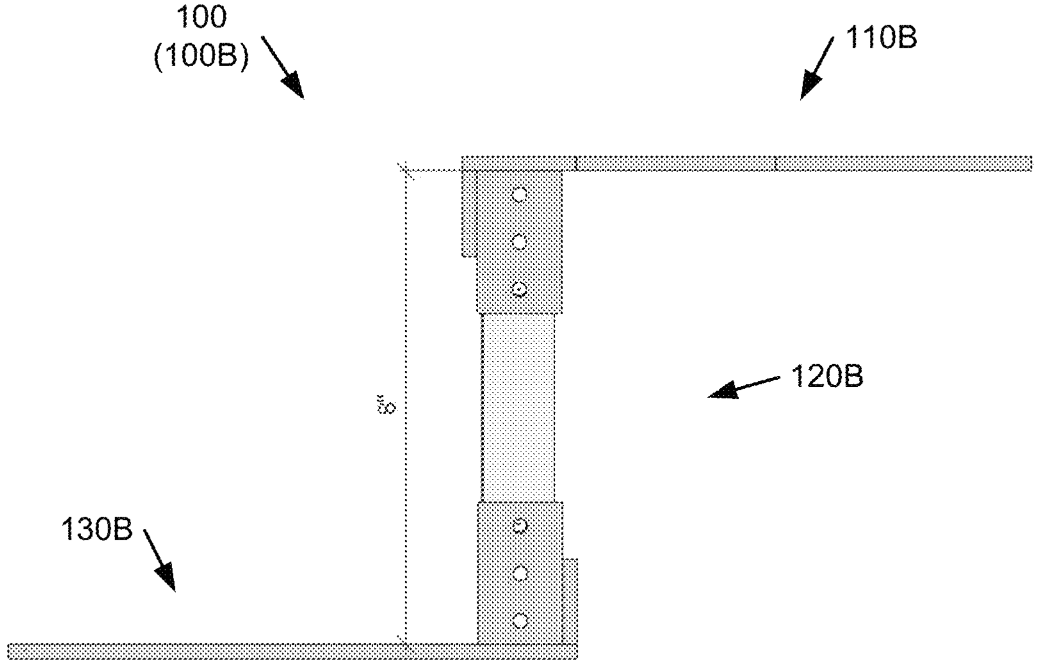

In some implementations, the head and neck cradle 100 may be configured to include a member 111, 131 adjacent to the middle portion 120 that provides additional horizontal head support, such as shown in FIGS. 4A and 5A. In some implementations, the head and neck cradle 100 may be configured to not include an additional horizontal head support member 111, 131 adjacent to the middle portion 120, such as shown in FIG. 2A.

Figure 5F:
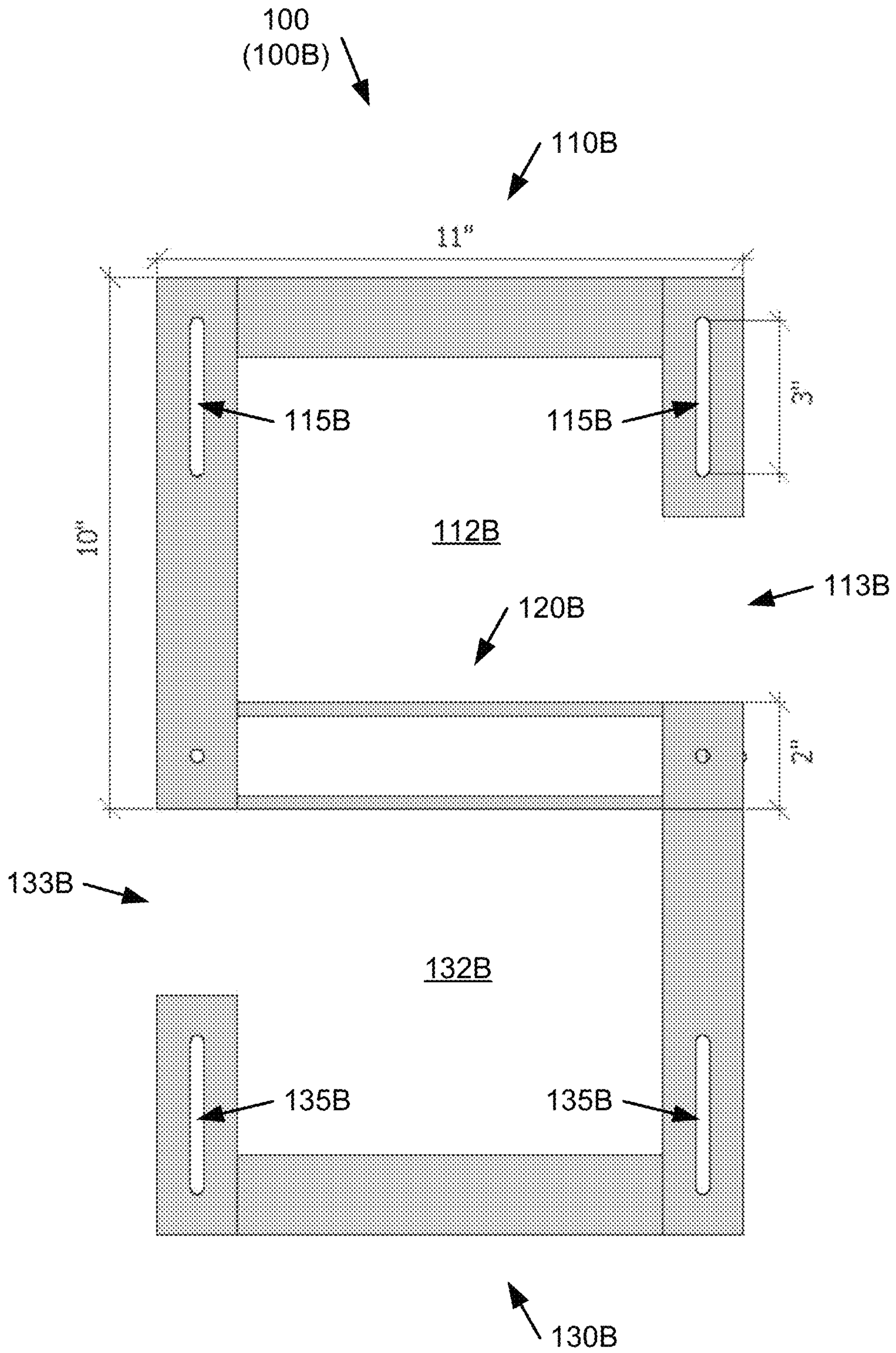
Figure 5G:
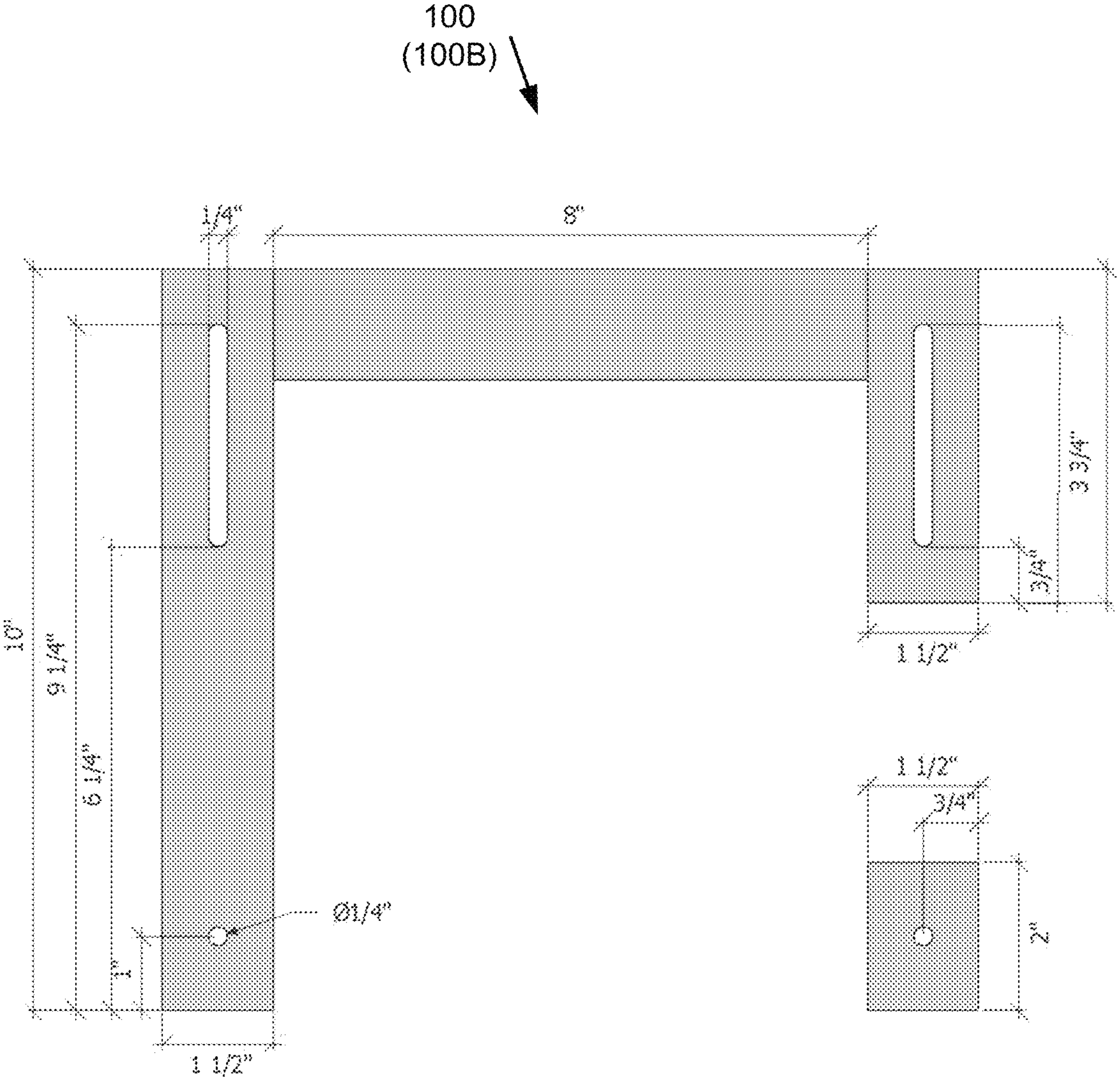
Figure 5H:
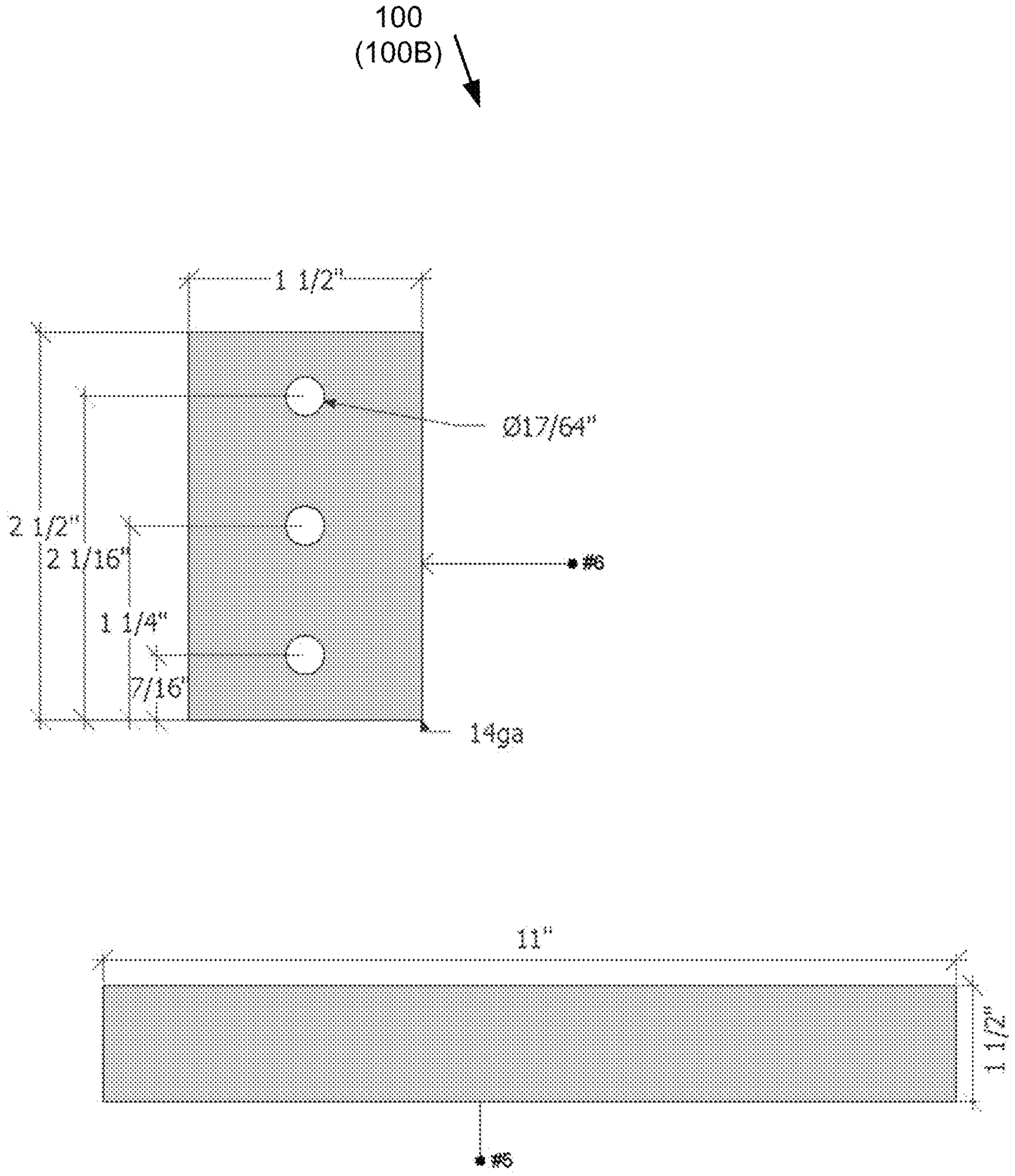
Figure 5I:
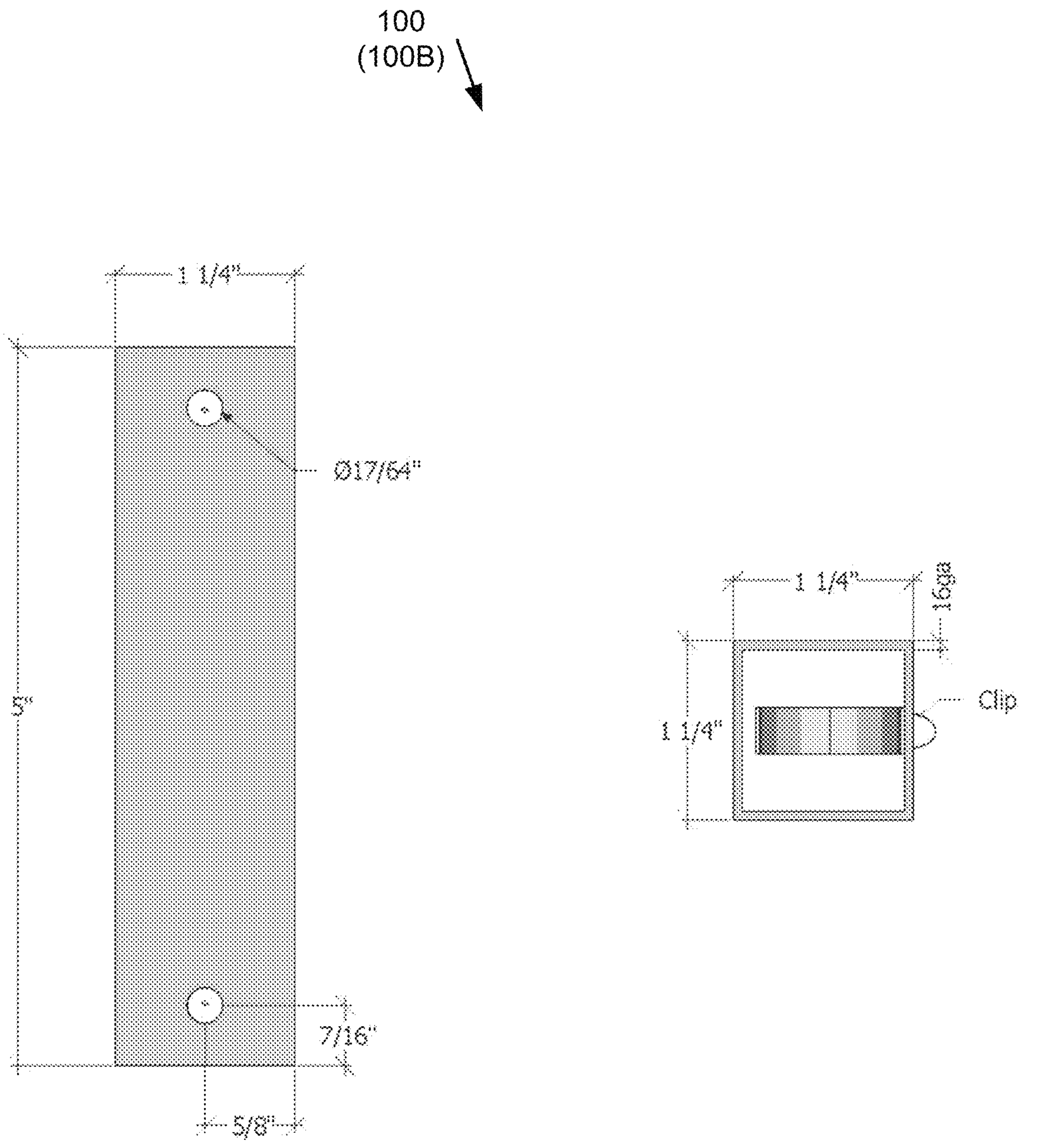

In some implementations, the head and neck cradle 100 may be configured to be adjustable for the head size of a patient. For example, in some implementations, the position of one or more of the members 111, 131 and/or the pad 150 may be adjustable, such as shown in FIGS. 5F and 6D.

In some implementations, the head and neck cradle 100 may be configured to be adjustable in height. For example, in some implementations, length of the middle portion 120 between the upper platform 110 and the lower platform 130 may be adjustable, such as shown in FIGS. 5A, 5B, 5D, and 5E.

Figure 4B:
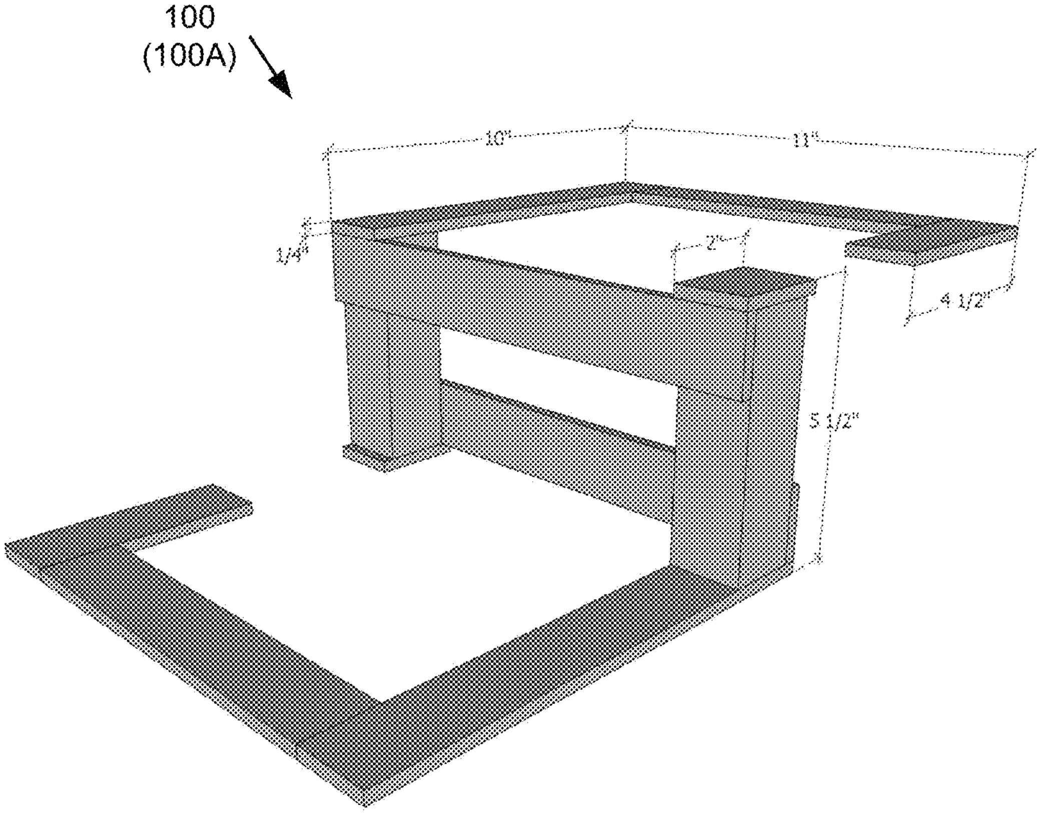
Figure 4C:
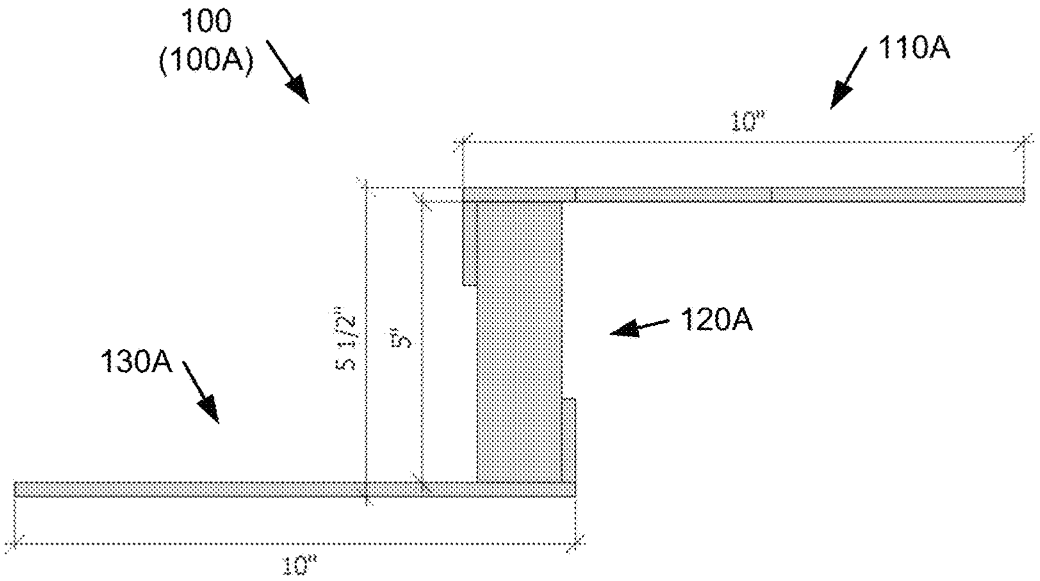

FIGS. 4A-4C illustrate another implementation of an example head and neck cradle 100 (100A) according to the present disclosure. In some implementations, the head and neck cradle 100A is the same or similar to the head and neck cradle 100 described above for FIGS. 2A-2E and 3, except as described below.

For example, as shown in FIG. 4A, in some implementations, the head and neck cradle 100A comprises an upper platform 110A, a middle platform (or middle portion) 120A, and a lower platform 130A that are generally the same or similar respectively to the above-described upper platform 110, middle platform (or middle portion) 120, and lower platform 130 of the head and neck cradle 100 of FIGS. 2A-2E.

As shown in FIG. 4A, in some implementations, the lower platform 130A of the head and neck cradle 100A further comprises an opening 133A through a side of the lower platform 130A that is the same or similar to the above-described opening 113 through a side of the upper platform 110 of the head and neck cradle 100. In this way, in some implementations, the head and neck cradle 100A is configured to be reversible such that the upper platform 110A and the lower platform 130A can be used reversibly.

As shown in FIG. 4A, in some implementations, the head and neck cradle 100A further comprises a member 111A, 131A adjacent to the middle portion 120A. In this way, in some implementations, the head and neck cradle 100A is configured to provide additional horizontal head support by the upper platform 110A or the lower platform 130A.

FIGS. 5A-5I illustrate another implementation of an example head and neck cradle 100 (100B) according to the present disclosure. In some implementations, the head and neck cradle 100B is the same or similar to the head and neck cradle 100A described above for FIGS. 4A-4C, except as described below.

For example, as shown in FIG. 5A, in some implementations, the head and neck cradle 100B comprises an upper platform 110B, a middle platform (or middle portion) 120B, and a lower platform 130B that are generally the same or similar respectively to the above-described upper platform 110A, middle platform (or middle portion) 120A, and lower platform 130A of the head and neck cradle 100A of FIGS. 4A-4C.

As shown in FIGS. 5A, 5B, 5D, and 5E, in some implementations, the head and neck cradle 100B is further configured to be adjustable in height by the length of the middle portion 120B between the upper platform 110B and the lower platform 130B being adjustable. For example, in some implementations, the middle portion 120B further comprises a plurality of adjustment openings 124B that allow the length adjustment of the middle portion 120B.

In some implementations, the adjustment openings 124B may be any suitable size. In some implementations, the adjustment openings 124B may be any suitable shape.

In some implementations, the adjustment openings 124B may be positioned in any suitable configuration to allow the length adjustment of the middle portion 120B.

In some implementations, the adjustment openings 124B are configured to engage with any suitable component to allow the length adjustment of the middle portion 120B. For example, in some implementations, the adjustment openings 124B may be configured to receive a bolt, screw, or other suitable fastener.

In some implementations, the head and neck cradle 100B may comprise any other suitable features that allow the length adjustment of the middle portion 120B for the height adjustment of the head and neck cradle 100B.

As shown in FIG. 5F, in some implementations, the head and neck cradle 100B is further configured to be adjustable for the head size of a patient by the position of one or more of the members 111B, 131B being adjustable. For example, in some implementations, the upper platform 110B and the lower platform 130B further comprise a plurality of adjustment slots 115B, 135B respectively that allow the size of the respective middle opening 112B, 132B to be adjusted.

In some implementations, the adjustment slots 115B, 135B may be any suitable size. In some implementations, the adjustment slots 115B, 135B may be any suitable shape.

In some implementations, the adjustment slots 115B, 135B may be positioned in any suitable configuration to allow the size adjustment of the respective middle opening 112B, 132B.

In some implementations, the adjustment slots 115B, 135B are configured to engage with any suitable component to allow the length adjustment of the middle portion 120B. For example, in some implementations, the adjustment slots 115B, 135B may be configured to receive a bolt, screw, or other suitable fastener.

In some implementations, the adjustment slots 115B, 135B may further or alternately be configured to allow the position adjustment of the above described pad 150 for the size adjustment of the respective middle opening 112B, 132B, such as described below for FIG. 6D.

In some implementations, the head and neck cradle 100B may comprise any other suitable features that allow the position adjustment of the members 111B, 131B respectively for the size adjustment of the middle opening 112B, 132B.

FIGS. 6A-6D illustrate another implementation of an example head and neck cradle 100 (100C) according to the present disclosure. In some implementations, the head and neck cradle 100C is the same or similar to the head and neck cradle 100B described above for FIGS. 5A-5I, except as described below.

Figure 6A:
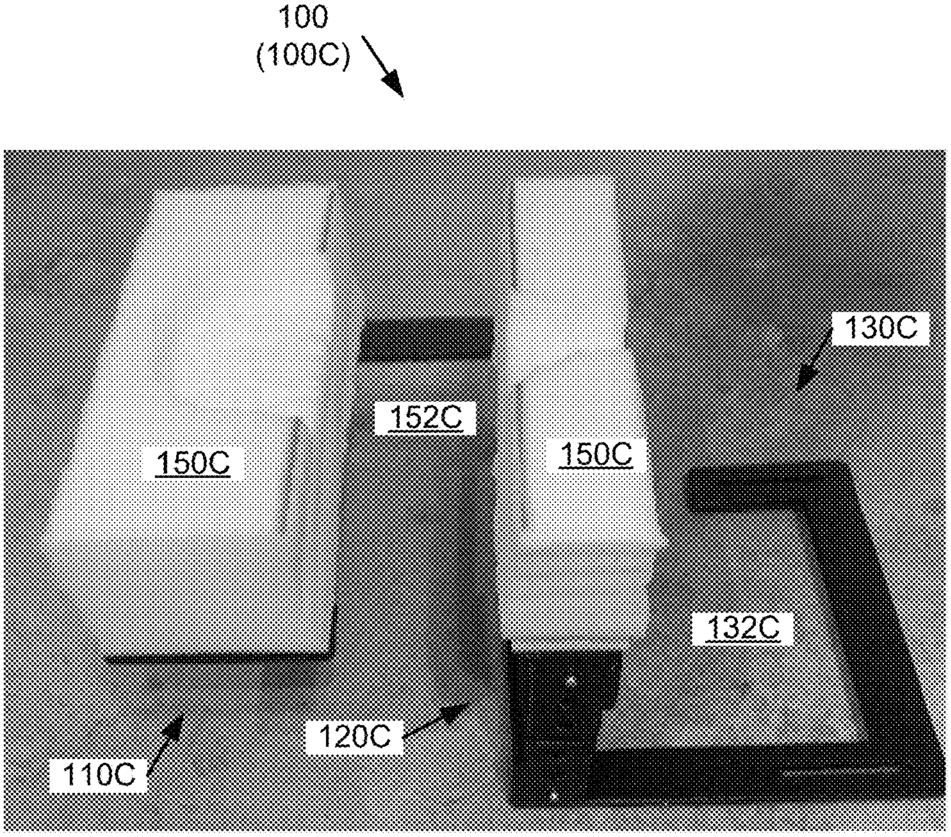
FIGS. 6A-6D illustrate another implementation of an example head and neck cradle according to the present disclosure.
Figure 6B:
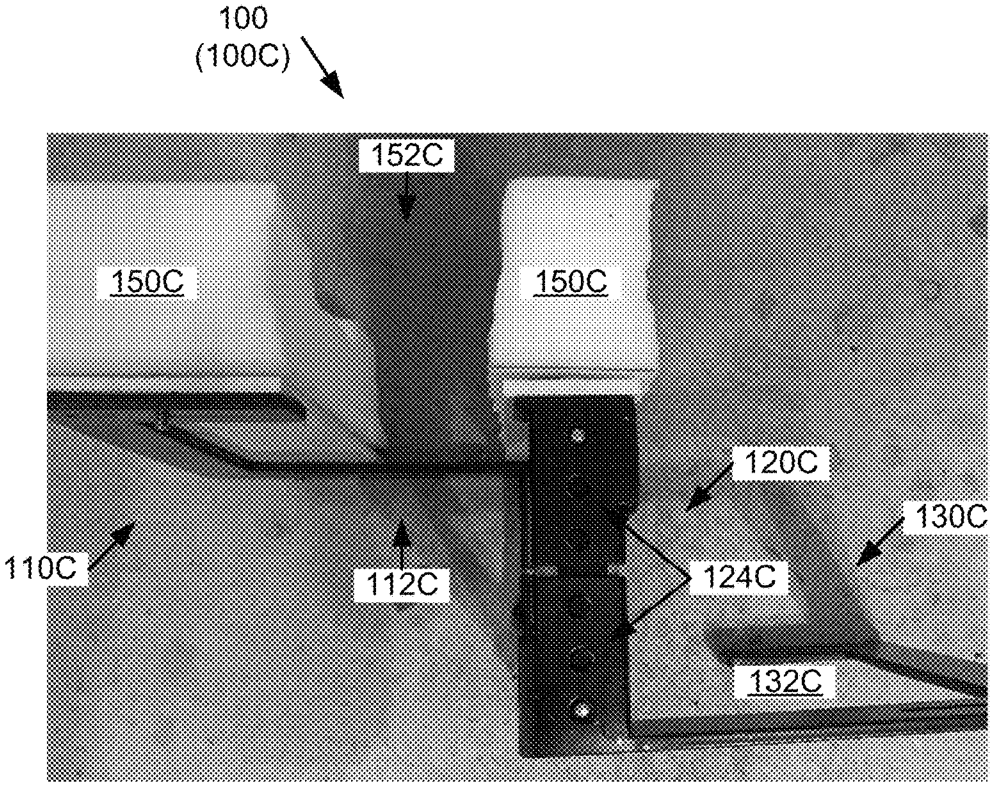
Figure 6C:
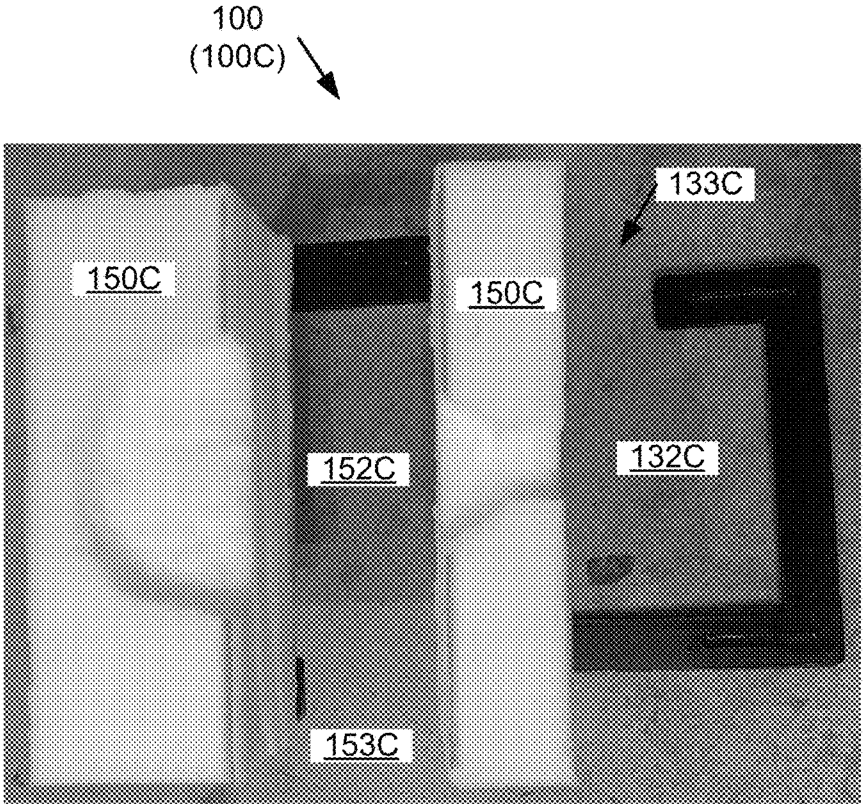
Figure 6D:
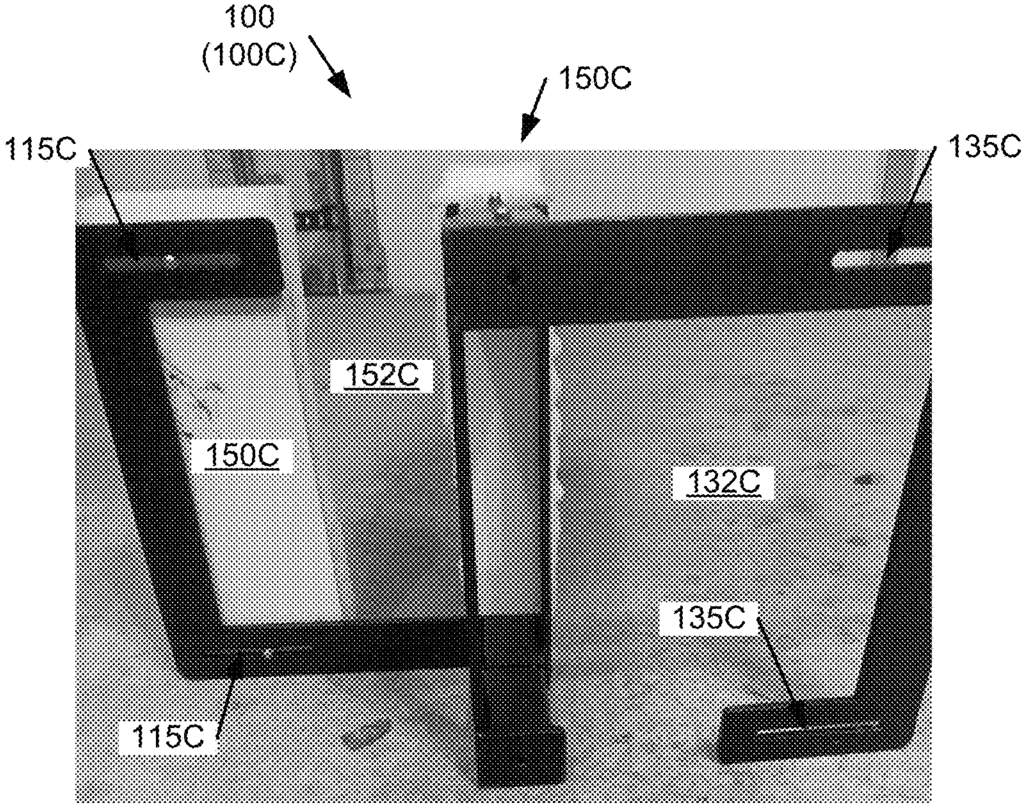

For example, as shown in FIGS. 6A and 6B, in some implementations, the head and neck cradle 100C comprises an upper platform 110C, a middle platform (or middle portion) 120C, and a lower platform 130C that are generally the same or similar respectively to the above-described upper platform 110B, middle platform (or middle portion) 120B, and lower platform 130B of the head and neck cradle 100B of FIGS. 5A-5I.

As shown in FIGS. 6B and 6D, in some implementations, the head and neck cradle 100C also comprises adjustment openings 124C and adjustment slots 115C, 135C that are the same or similar respectively to the above-described adjustment openings 124B and adjustment slots 115B, 135B of the head and neck cradle 100B of FIGS. 5A-5I.

As shown in FIGS. 6A and 6B, in some implementations, the head and neck cradle 100C further comprises a pad 150C that is generally similar to the pad 150 described above for FIGS. 2D and 2E. In some implementations, the pad 150C may comprise two or more pieces.

As shown in FIG. 6B, in some implementations, one piece of the pad 150C is connected to one or more members 111C of the upper platform 110C and another piece of the pad 150C is connected to one or more other members 111C of the upper platform 110C. In this way, in some implementations, the pieces of the pad 150C can be repositioned to adjust the size of the pad middle opening 152 for the head size of a patient.

As shown in FIG. 6A, in some implementations, the pad 150C is sized and shaped to receive and support a patient's head. For example, in some implementations, the pad 150C comprises a varying size and shape that allows the pad 150C to comfortably receive and support a patient's head.

In some implementations, the pad 150C is further configured (e.g., sized, shaped, and/or composed) to relieve pressure on the forehead, chin, etc. of a patient while using the head and neck cradle 100C.

As shown in FIG. 6D, in some implementations, the adjustment slots 115C, 135C are configured to allow the attachment of the pad 150C to the platform 110C, 130C, such as by a bolt, screw, or other suitable fastener. In some implementations, the adjustment slots 115C, 135C are configured to allow the pad 150C to be movably attached to the platform 110C, 130C.

As shown in FIG. 6D, in some implementations, the adjustment slots 115C, 135C are configured to allow the position adjustment of the pad 150C such that the size of the pad middle opening 152 can be adjusted for the head size of a patient. For example, in some implementations, the adjustment slots 115C, 135C allow the attached pieces of the pad 150C to be moved together or apart.

Figure 7:
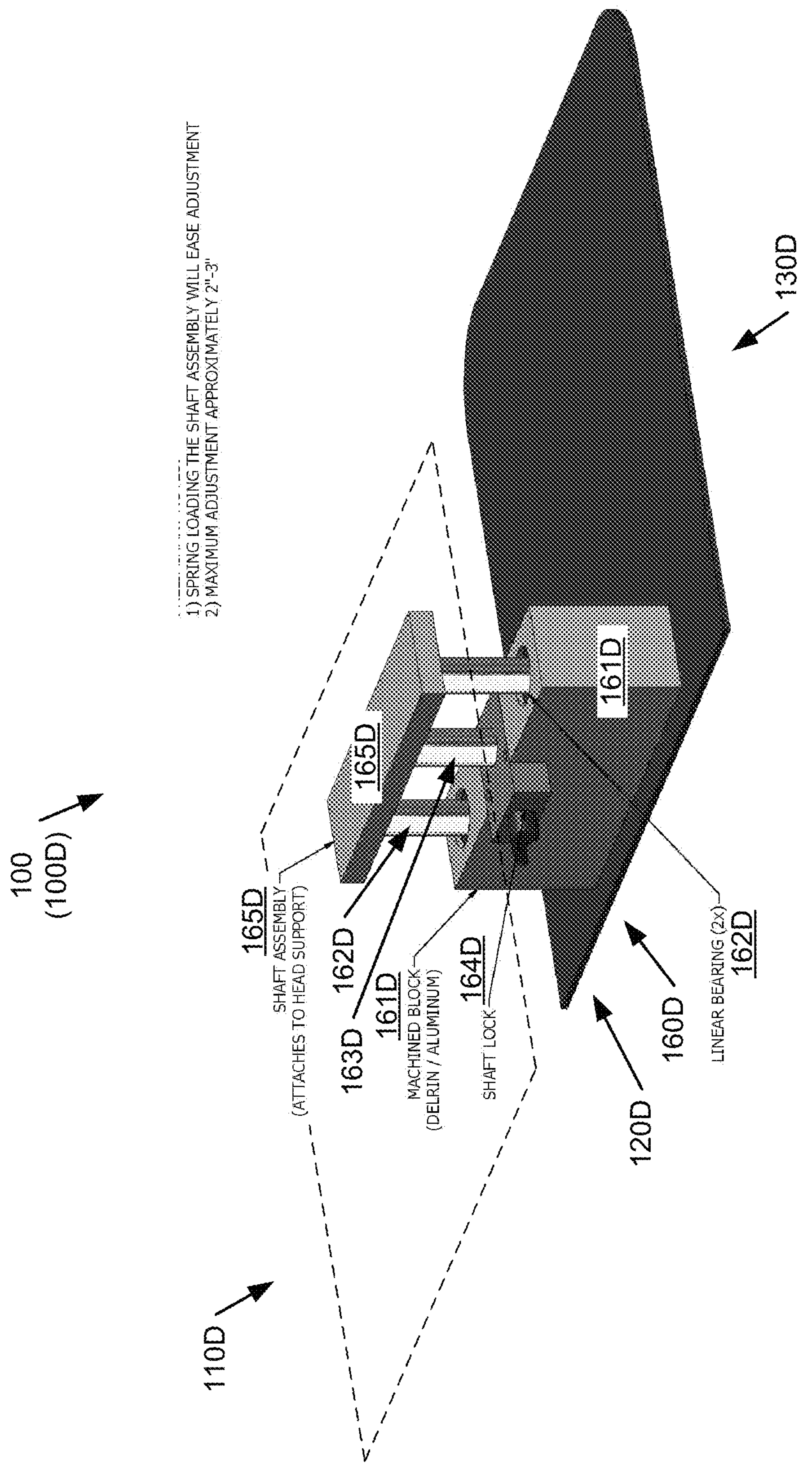
FIG. 7 illustrates another implementation of an example head and neck cradle according to the present disclosure.

FIG. 7 illustrates another implementation of an example head and neck cradle 100 (100D) according to the present disclosure. In some implementations, the head and neck cradle 100D is the same or similar to the head and neck cradle 100 described above for FIGS. 2A-2E and 3, except as described below.

For example, as shown in FIG. 7, in some implementations, the head and neck cradle 100D comprises an upper platform 110D, a middle platform (or middle portion) 120D, and a lower platform 130D that are generally the same or similar respectively to the above-described upper platform 110, middle platform (or middle portion) 120, and lower platform 130 of the head and neck cradle 100 of FIGS. 2A-2E.

In some implementations, the middle portion 120D of the head and neck cradle 100D further comprises a linear bearing, shaft, and block assembly 160D that is configured such that the height-length of the middle portion 120D between the upper platform 110D and the lower platform 130D is adjustable similar to the middle portion 120B of the head and neck cradle 100B of FIGS. 5A-5I.

As shown in FIG. 7, in some implementations, the assembly 160D comprises a block 161D, one or more linear bearings 162D, one or more shafts 163D, one or more shaft locks 164D, and a shaft assembly (or shaft platform) 165D.

In some implementations, the block 161D is configured to retractably receive the linear bearing 162D and shaft 163D and to connect the assembly 160D to the lower platform 130D. In some implementations, the block 161D may comprise any suitable block, such as a machined block of delrin or aluminum, or other suitable component.

In some implementations, the linear bearings 162D are configured to guide and support the shaft platform 165D and to extend and retract from the block 161D to allow the height-length adjustment of the middle portion 120D. In some implementations, the linear bearings 162D may comprise any suitable linear bearing or other suitable component.

In some implementations, the shaft 163D is configured to extend and retract from the block 161D and to control the positioning of the shaft platform 165D to allow the height-length adjustment of the middle portion 120D. In some implementations, the shaft 163D may comprise a spring or spring mechanism configured to assist with extending and/or retracting the shaft 163D.

In some implementations, the shaft 163D may comprise any suitable shaft or other suitable component.

In some implementations, the shaft lock 164D is configured to secure the shaft 163D at any suitable extension from the block 161D to secure the positioning of the shaft platform 165D to allow the height-length adjustment of the middle portion 120D. In some implementations, the shaft lock 164D may comprise any suitable shaft lock or other suitable component.

In some implementations, the shaft platform 165D is configured to connect the assembly 160D to the upper platform 110D and to allow the height-length adjustment of the middle portion 120D. In some implementations, the shaft platform 165D may comprise any suitable shaft platform or other suitable component.

FIGS. 8A-8G illustrate another implementation of an example head and neck cradle 200 according to the present disclosure. In some implementations, the head and neck cradle 200 is the same or similar to the head and neck cradle 100C described above for FIGS. 6A-6D, except as described below.

Figure 8A:
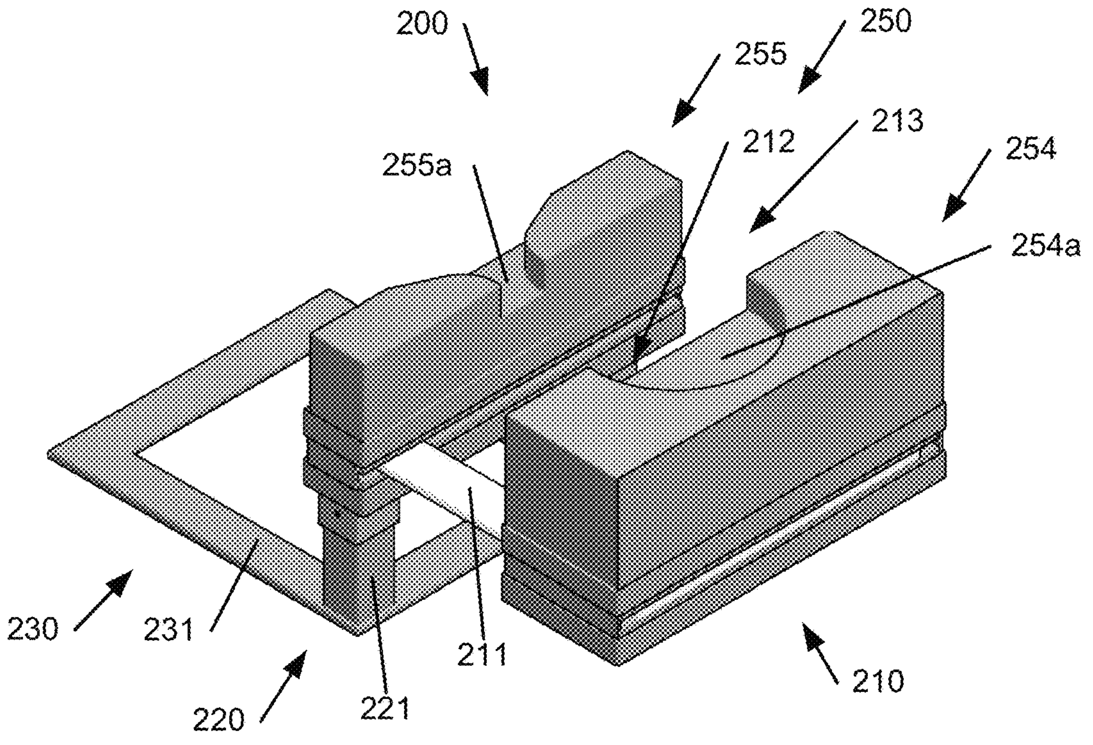
FIGS. 8A-8G illustrate another implementation of an example head and neck cradle according to the present disclosure.
Figure 8B:
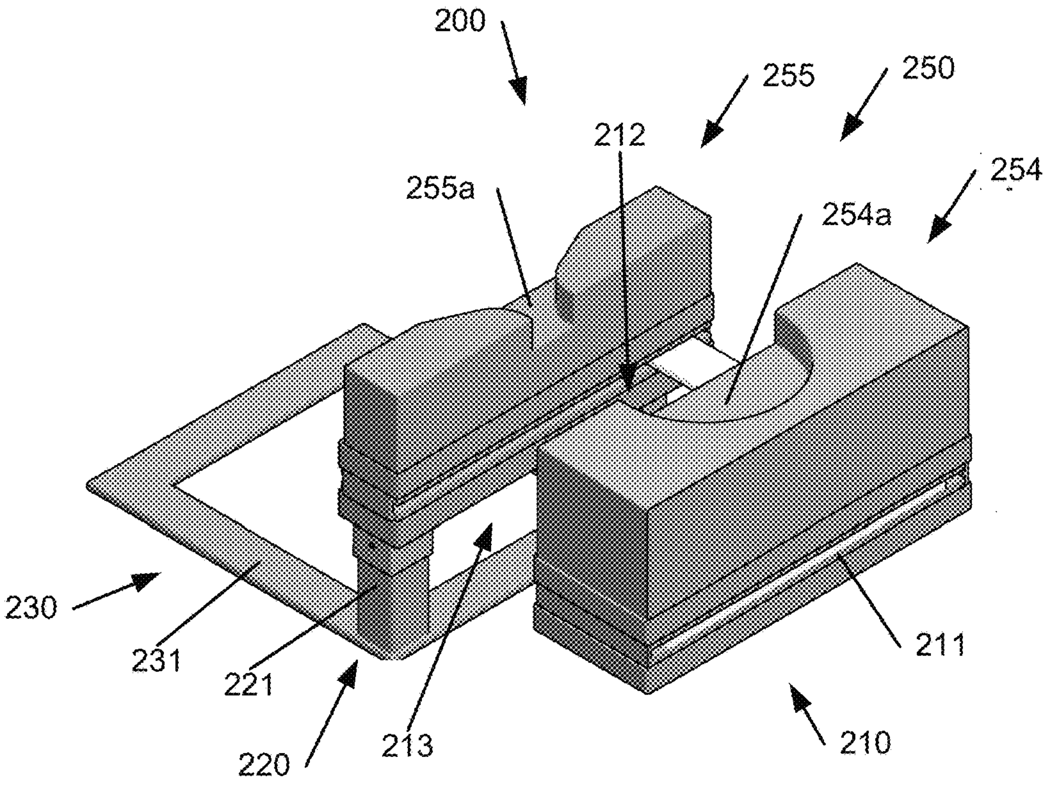
Figure 8C:
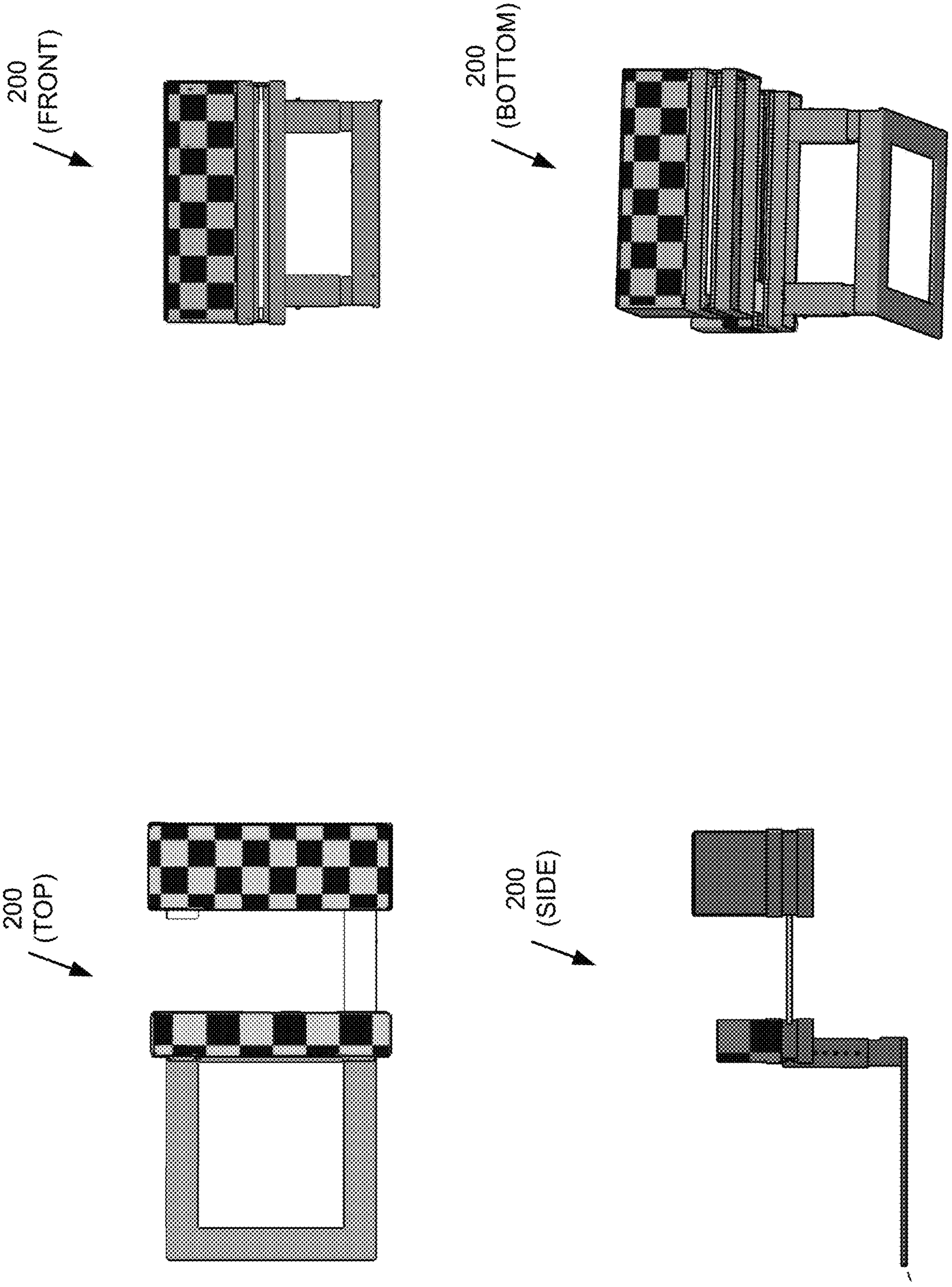

For example, as shown in FIGS. 8A and 8B, in some implementations, the head and neck cradle 200 comprises an upper platform 210, a middle platform (or middle portion) 220, a lower platform 230, and a pad 250 that are generally the same or similar respectively to the above-described upper platform 110C, middle platform (or middle portion) 120C, lower platform 130C, and pad 150C of the head and neck cradle 100C of FIGS. 6A-6D.

In some implementations, the upper platform 210 of the head and neck cradle 200 is further configured to be flipped over to reposition the side opening 213 from one side of the upper platform 210 to the other, such as shown in FIGS. 8A, 8B, 8E, and 8F. For example, in some implementations, the upper platform 210 is configured to be detached from the middle portion 220, flipped (or turned) over to the other (or opposite) side, and reattached to the middle portion 220 such that the side opening 213 is moved from one side of the upper platform 210 to the other.

Figure 8D:
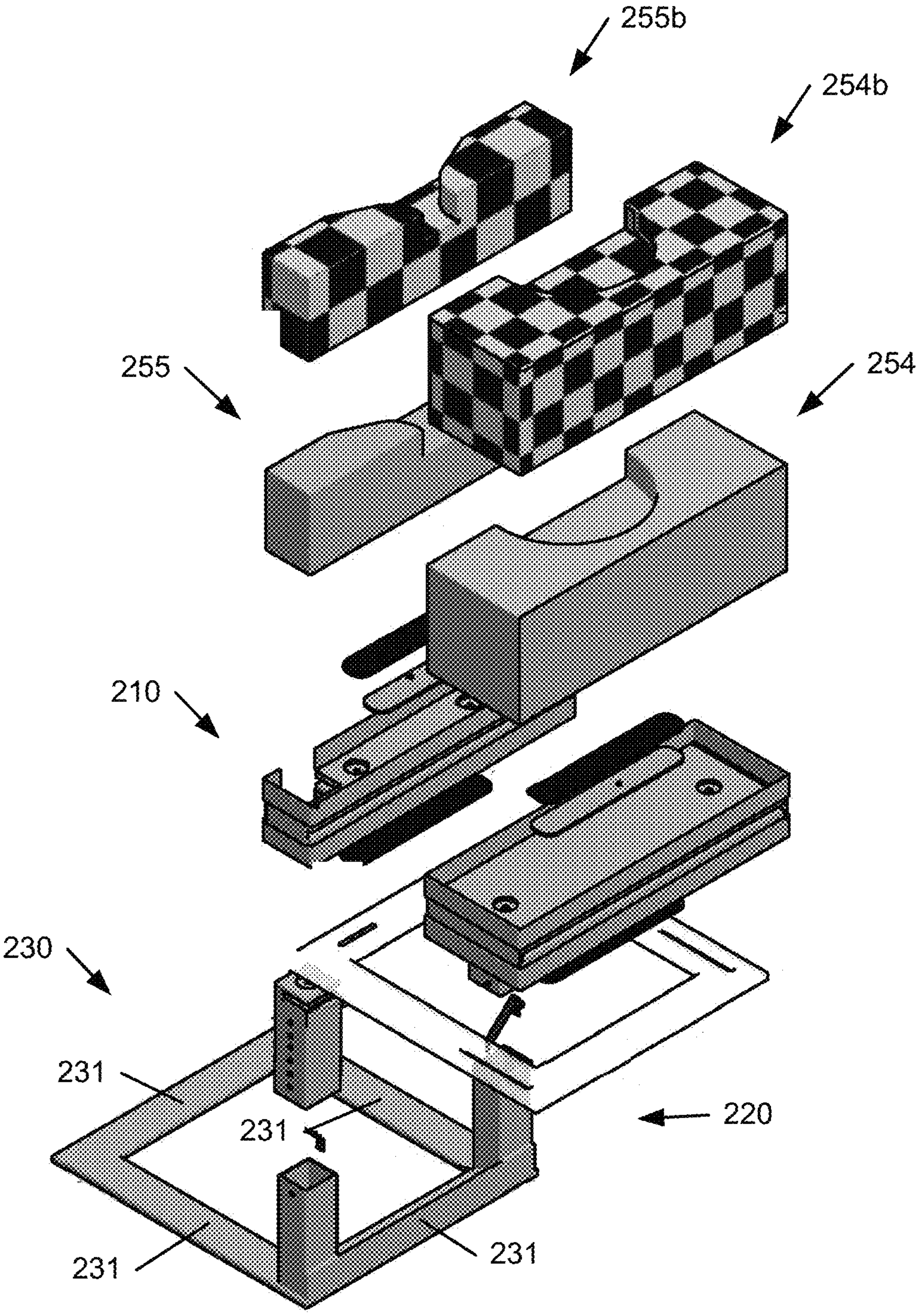
Figure 8E:
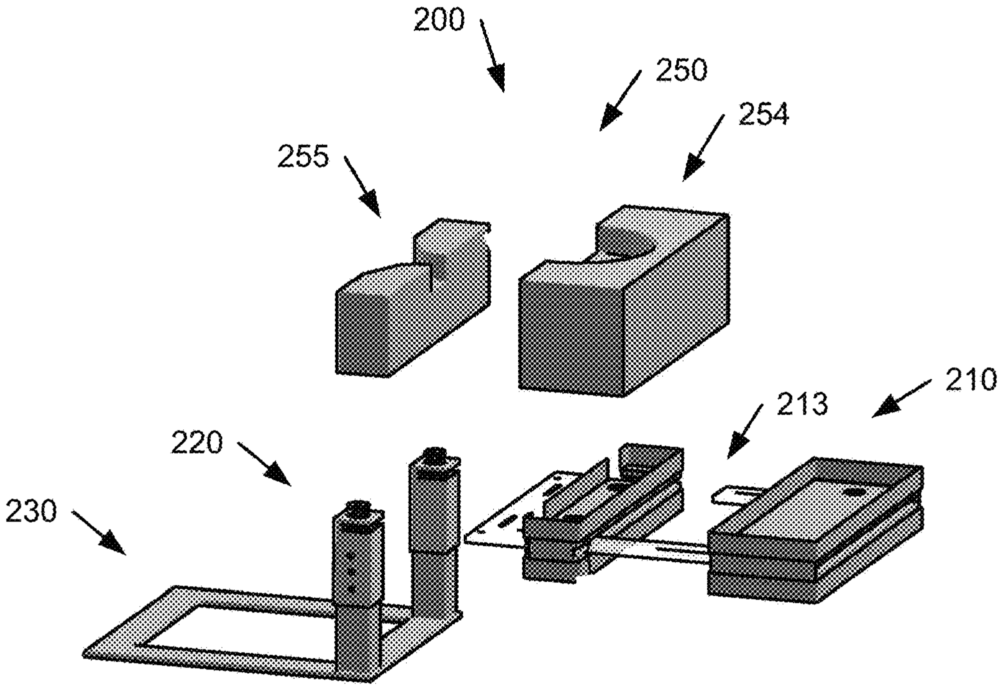
Figure 8F:
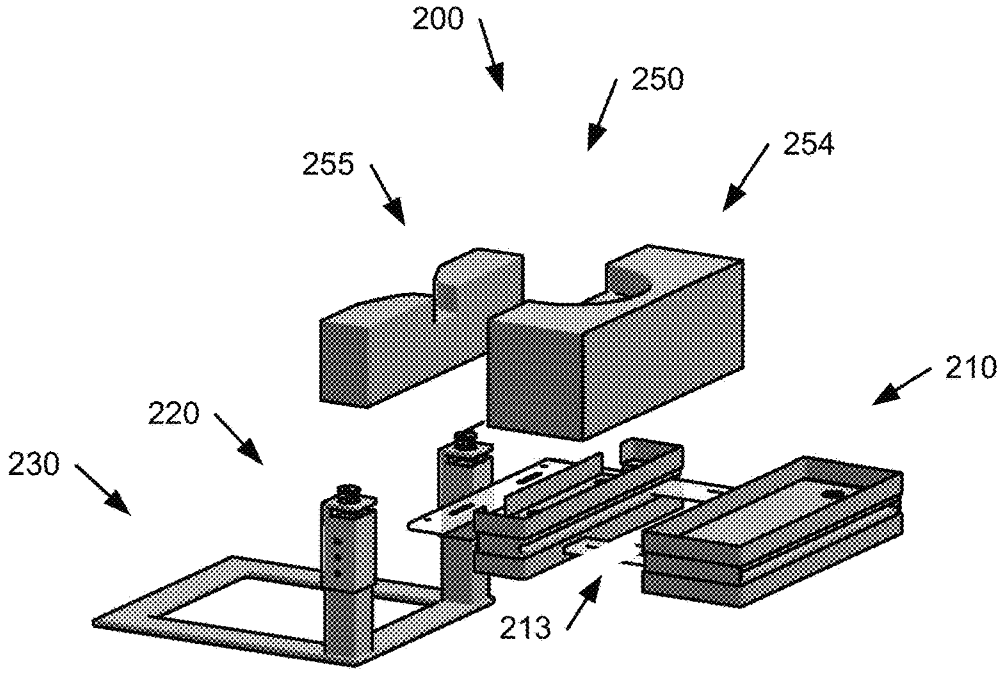
Figure 8G:
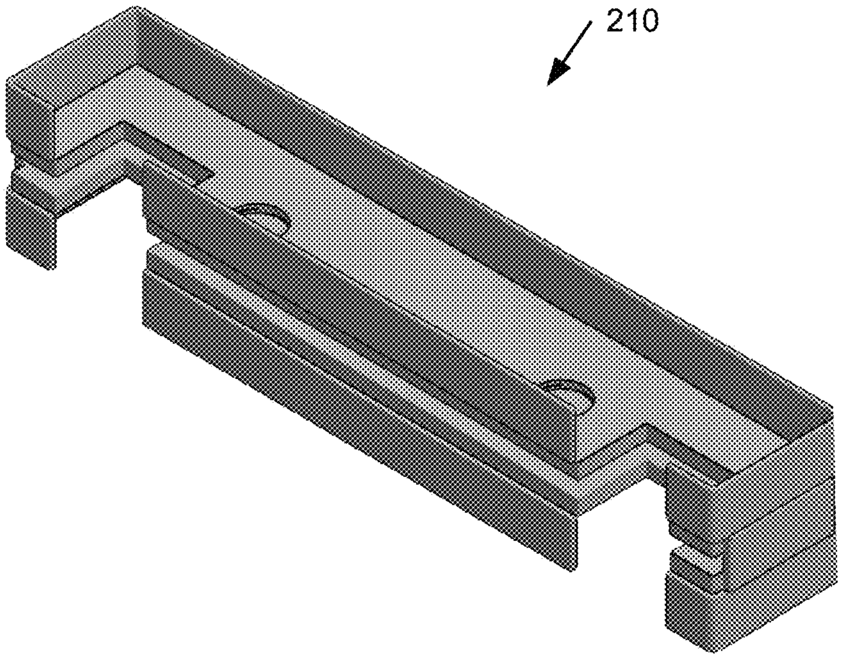

As shown in FIGS. 8E-8G, in some implementations, the upper platform 210 is further configured to allow the pad 250 to attach to either side of the upper platform 210, such as when the upper platform 210 is flipped over.

As shown in FIG. 8D, in some implementations, the members 231 of the lower platform 230 may be further configured to form a four-sided square or rectangular shaped platform.

As shown in FIGS. 8A and 8B, in some implementations, the pad 250 further comprises a head pad 254 and a chin/neck pad 255 configured to separately attach to the upper platform 210. For example, in some implementations, the pads 254, 255 are configured to attach to opposite positioned members 231 of the upper platform 210 such that a patient's face between the patient's neck and forehead can position within the opening 212 of the upper platform 210 and adjacent to the side opening 213, such as shown in FIGS. 10E-10L (described below).

In some implementations, the head pad 254 is configured to support a patient's head and/or forehead, such as shown in FIGS. 10E-10L (described below), and/or any other suitable part of the patient.

Figure 10A:
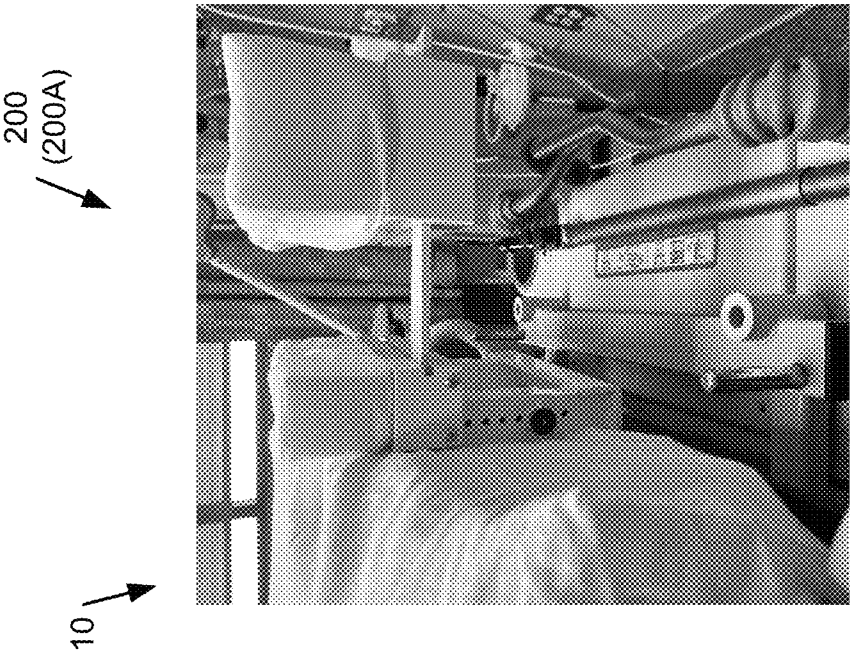
FIGS. 10A-10L illustrate an example use of the head and neck cradle according to the present disclosure.
Figure 10B:
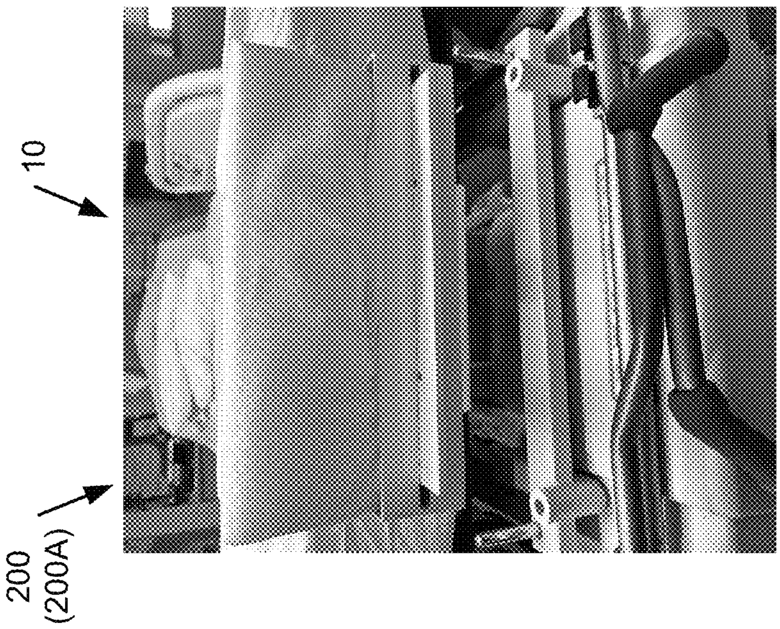
Figure 10C:
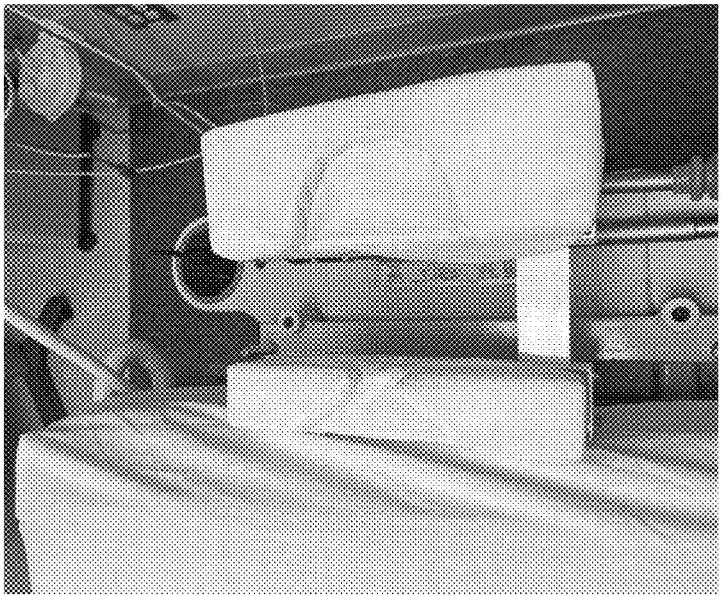
Figure 10D:
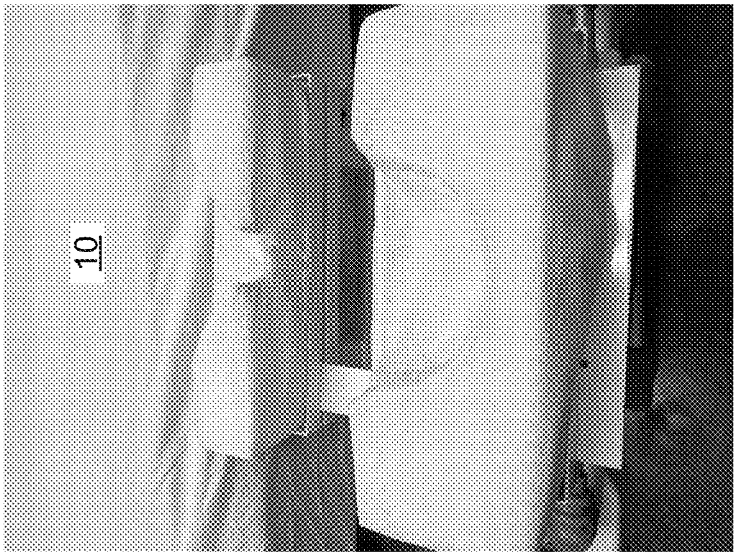
Figure 10F:
Figure 10E:
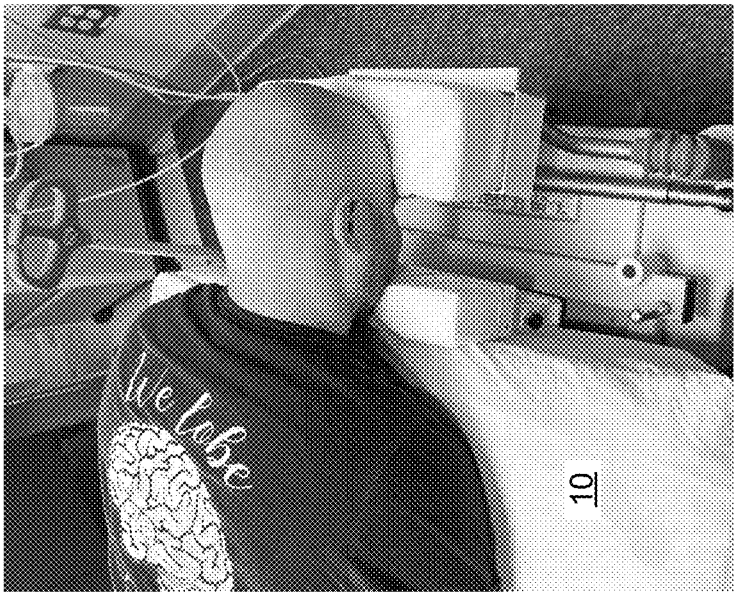
Figure 10H:
Figure 10G:
Figure 10J:
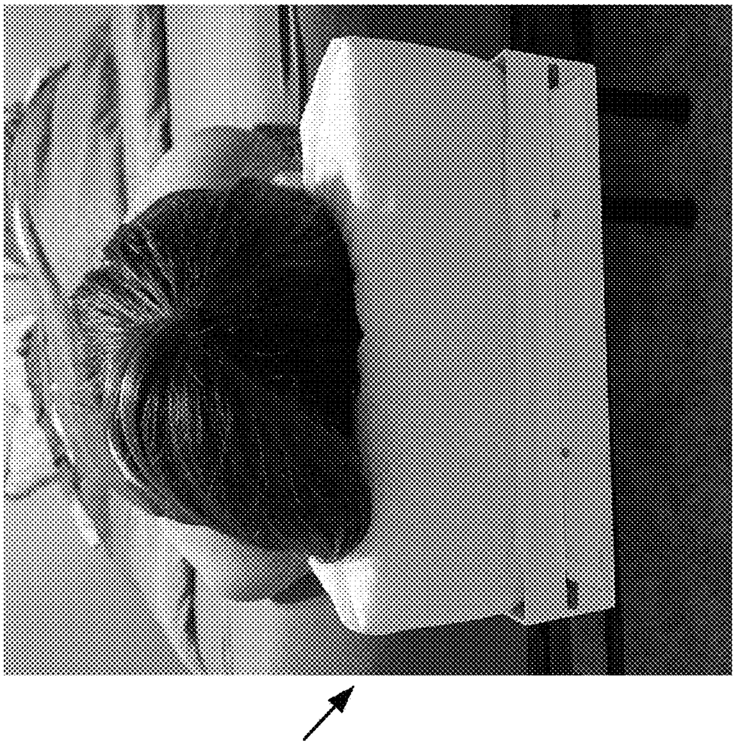
Figure 10I:
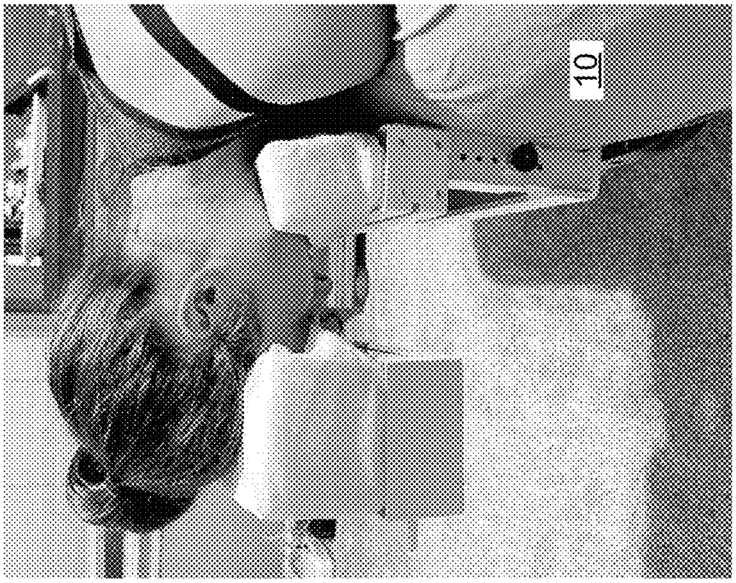
Figure 10L:
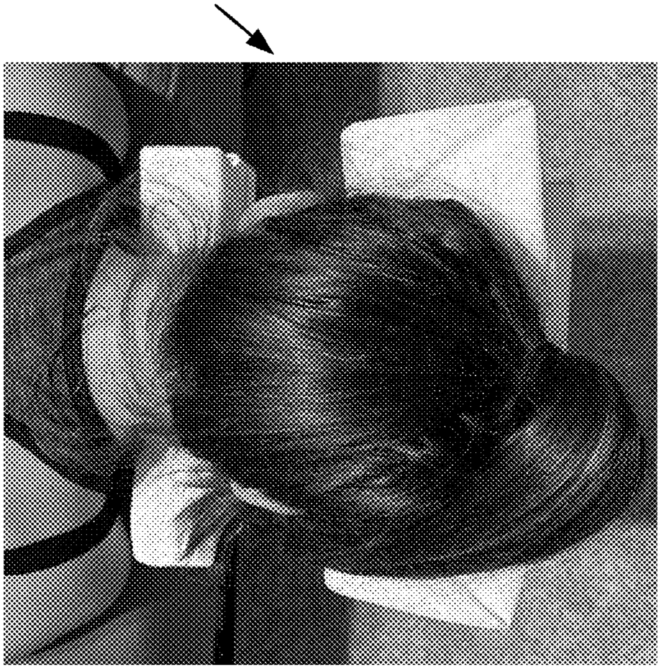
Figure 10K:

In some implementations, the chin/neck pad 255 is configured to support a patient's chin (such as shown in FIGS. 10E and 10F), a patient's neck (such as shown in FIGS. 10G-10I, 10K, and 10L), and/or any other suitable part of the patient.

In some implementations, the pad 250 is further configured to attach and detach from the upper platform 210 by any suitable attachment means, such as a hook and loop fastener, snap fastener, etc.

As shown in FIGS. 8A and 8B, in some implementations, the pad 250 further comprises cutout portions 254*a*, 255*a* that are configured to comfortably receive a portion of a patient's head and chin/neck (i.e., chin and/or neck) respectively.

As shown in FIG. 8D, in some implementations, the pad 250 may further comprise pad covers 254*b*, 255*b*. In some implementations, the pad covers 254*b*, 255*b* are a removable and/or replaceable pad cover for a patient's head and chin/neck to position on, such as for sanitary, comfort, etc, purposes.

In some implementations, the covers 254*b*, 255*b* are configured to be moisture wicking. In some implementations, the covers 254*b*, 255*b* are configured to be form-fitting to the pads 254 255, such as similar to a fitted sheet. For example, as shown in FIGS. 9J-9M (described below), in some implementations, the covers 254*b*, 255*b* comprise fitting support 254*c*, 255*c*, such as an elastic band and/or similar fit-supporting components.

FIGS. 9A-9M illustrate another implementation of an example head and neck cradle 200 (200A) according to the present disclosure. In some implementations, the head and neck cradle 200A is the same or similar to the head and neck cradle 200 described above for FIGS. 8A-8G.

Figure 9A:
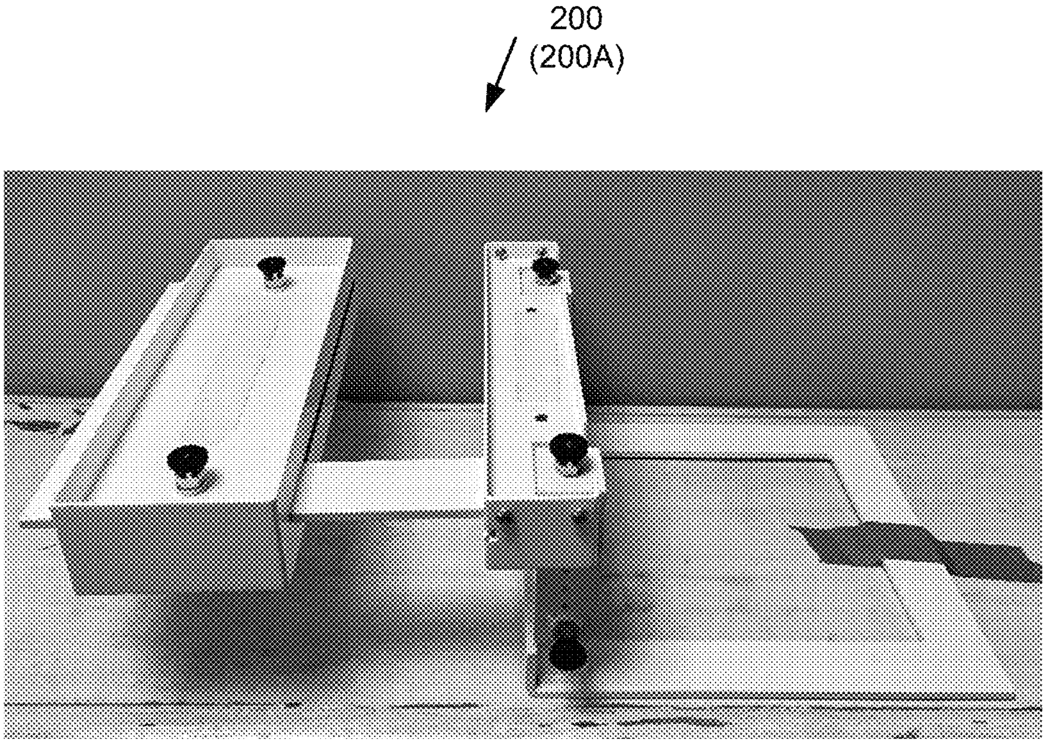
FIGS. 9A-9M illustrate another implementation of an example head and neck cradle according to the present disclosure.
Figure 9B:
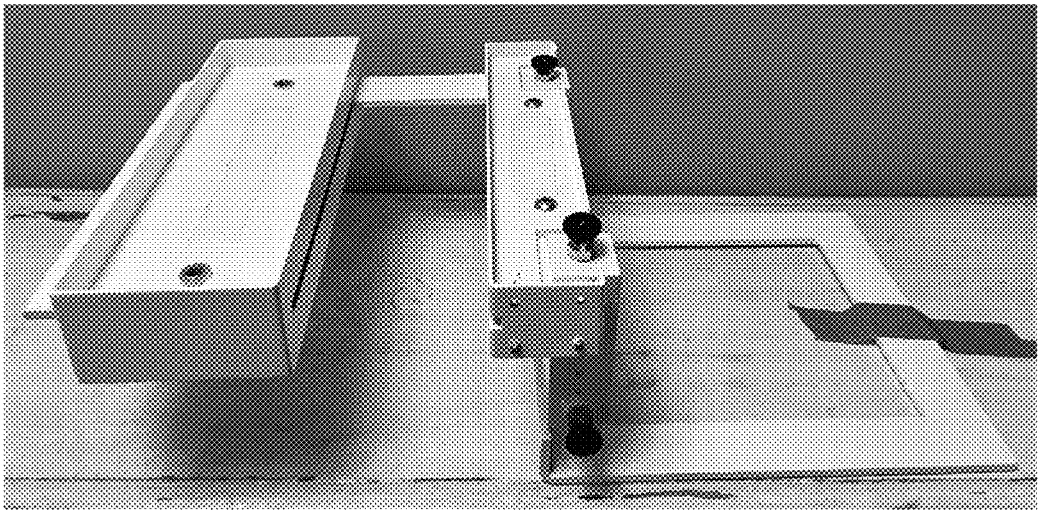
Figure 9C:
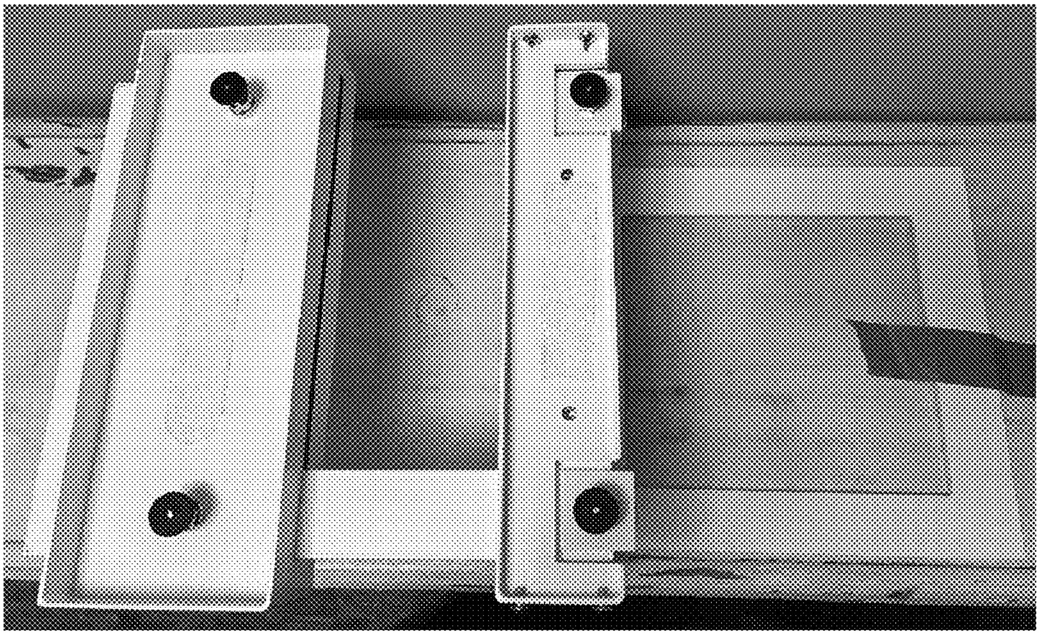
Figure 9D:
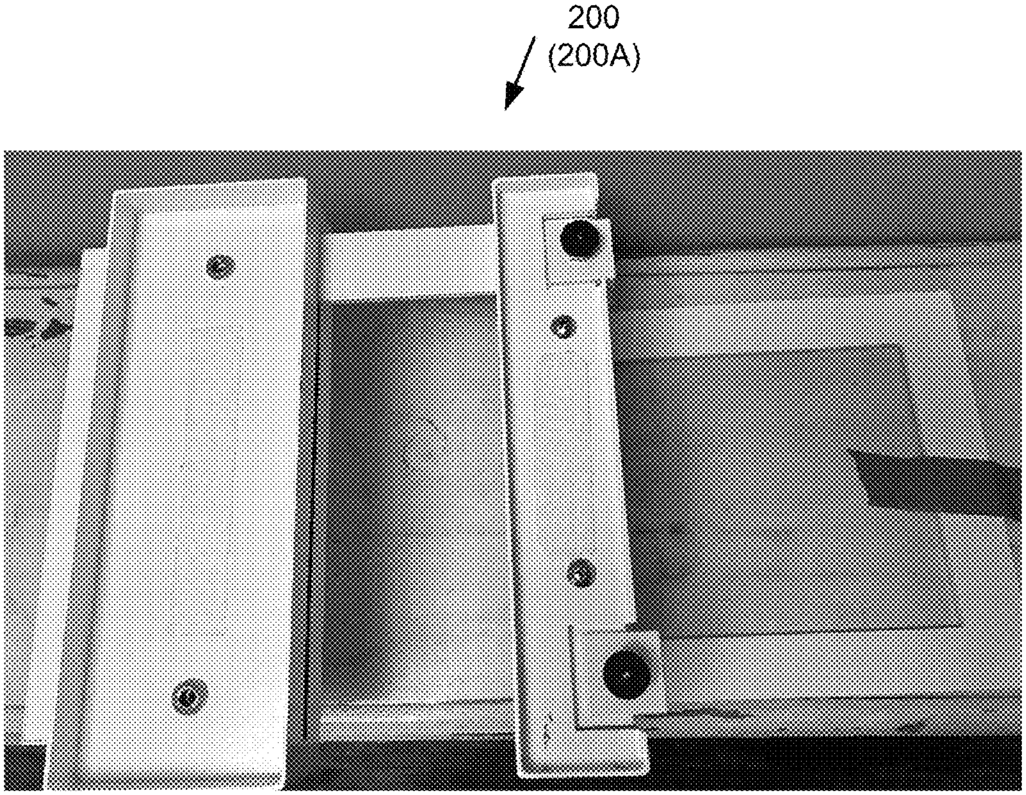
Figure 9E:
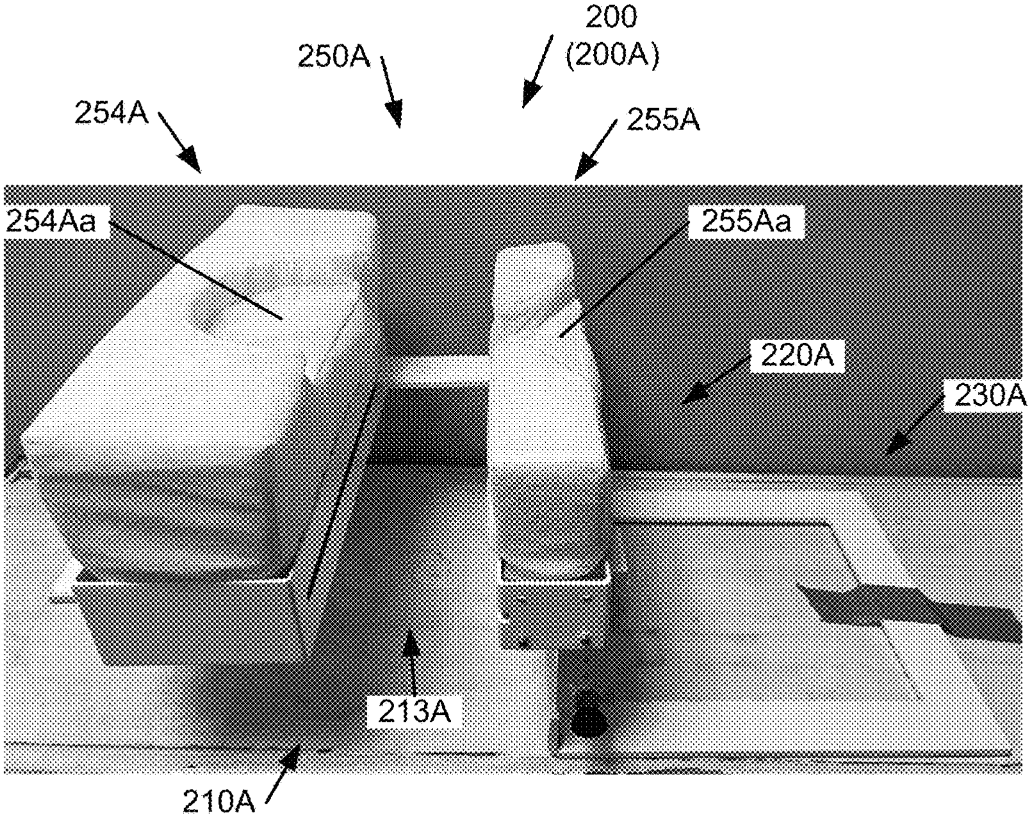
Figure 9F:
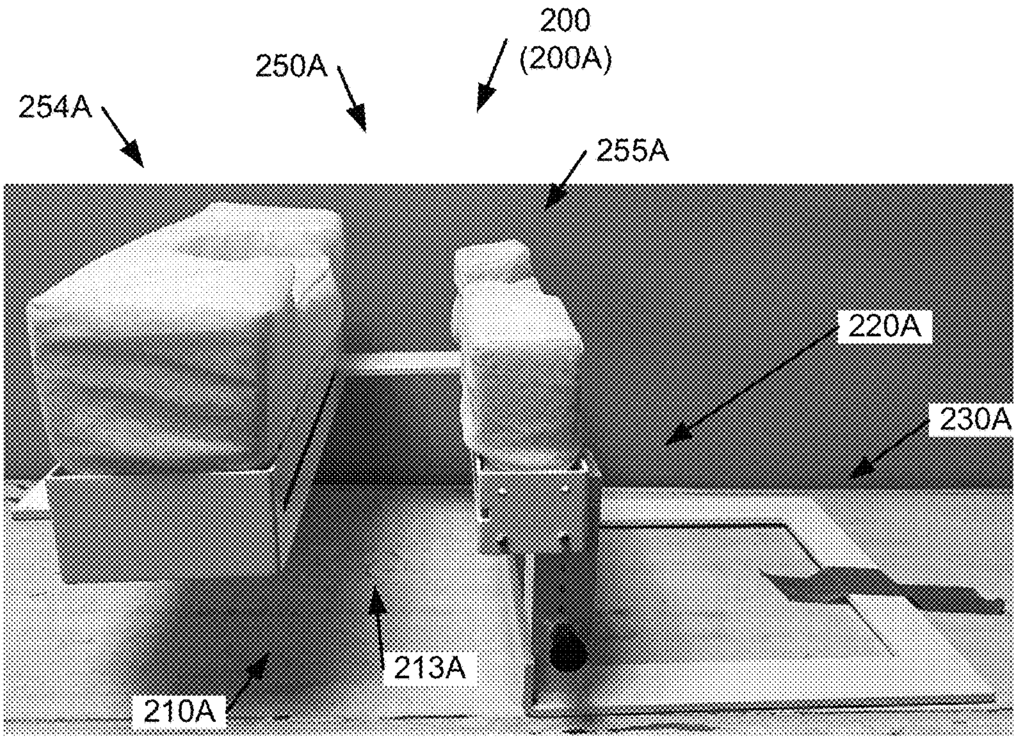
Figure 9G:
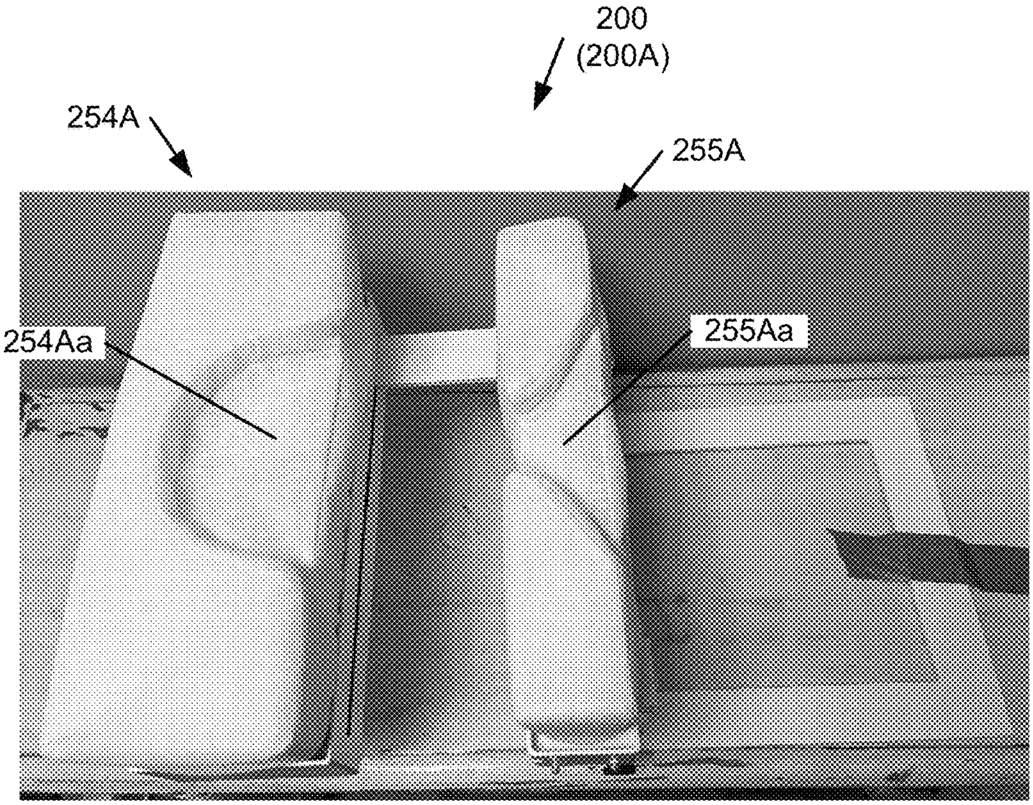
Figure 9H:
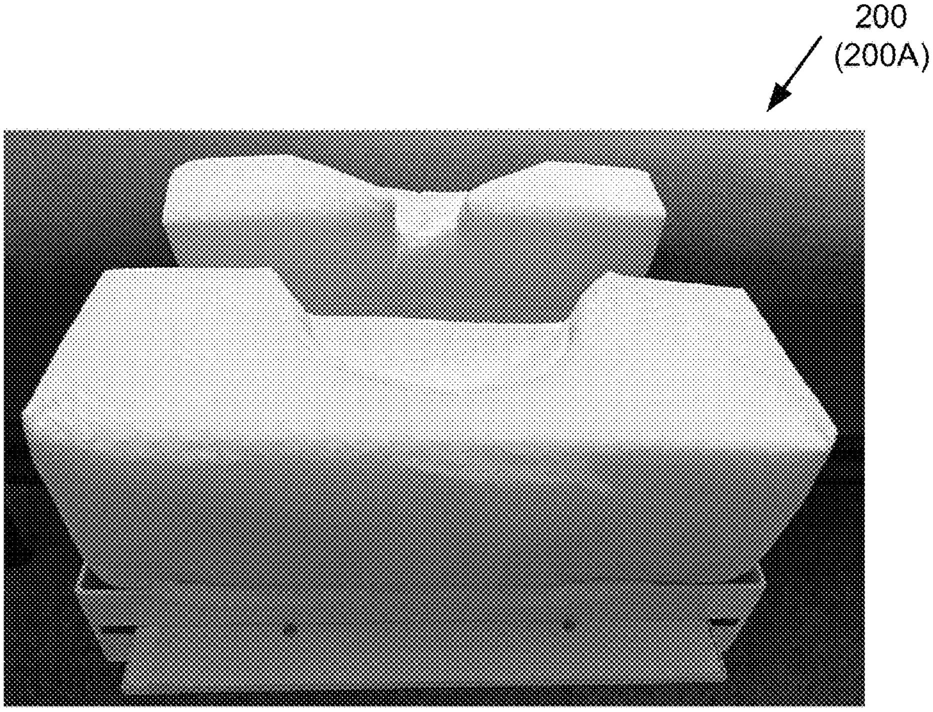
Figure 9I:
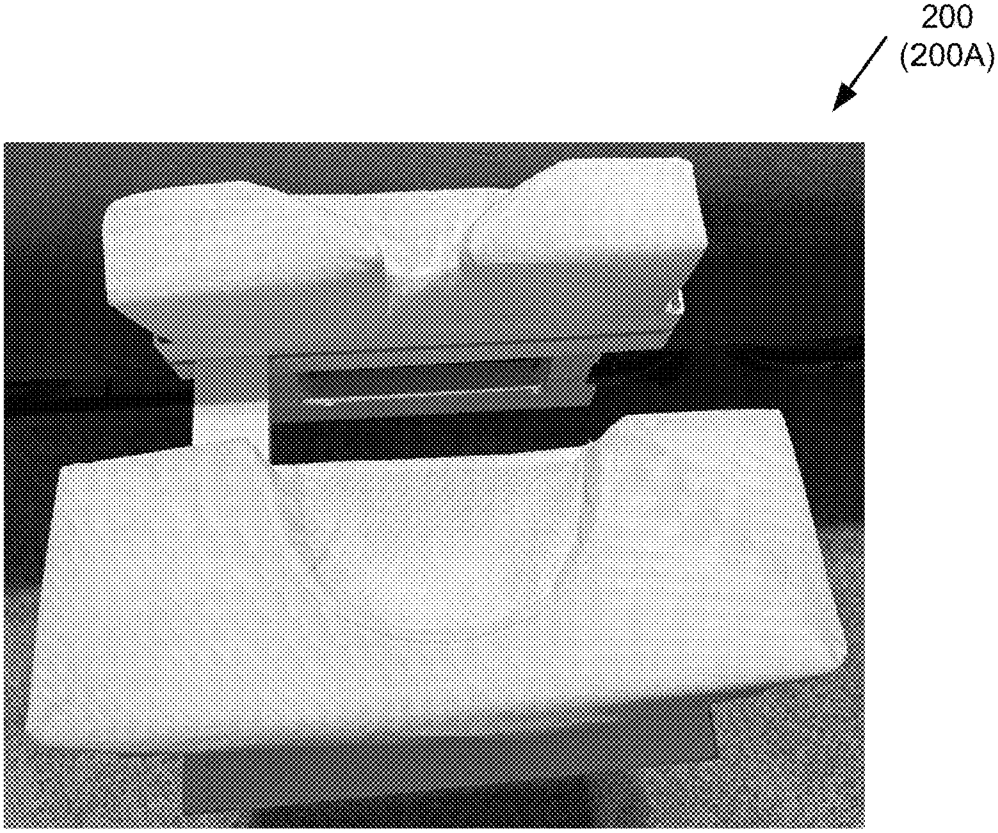
Figure 9J:
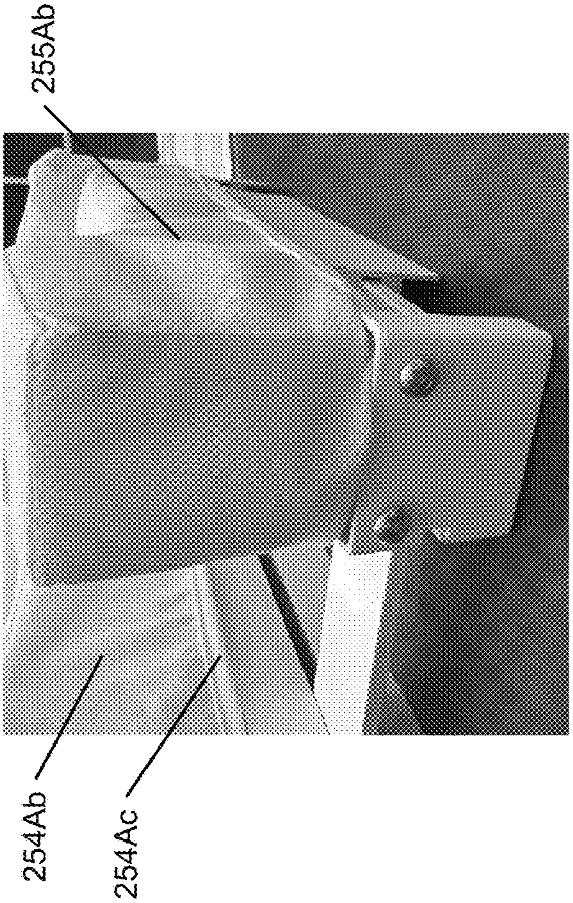
Figure 9K:
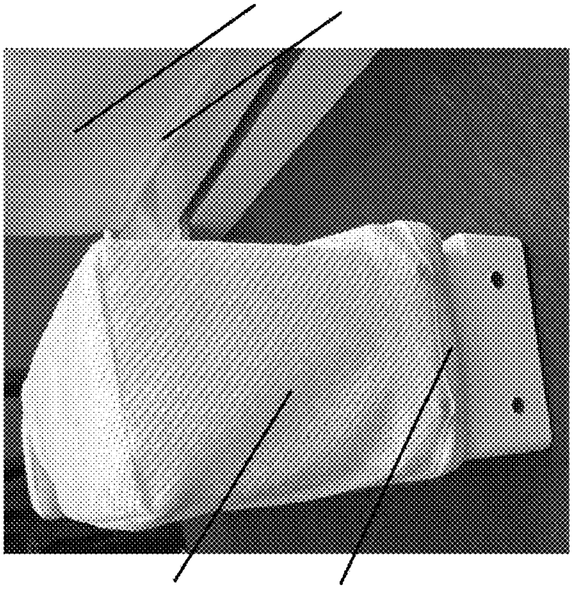
Figure 9L:
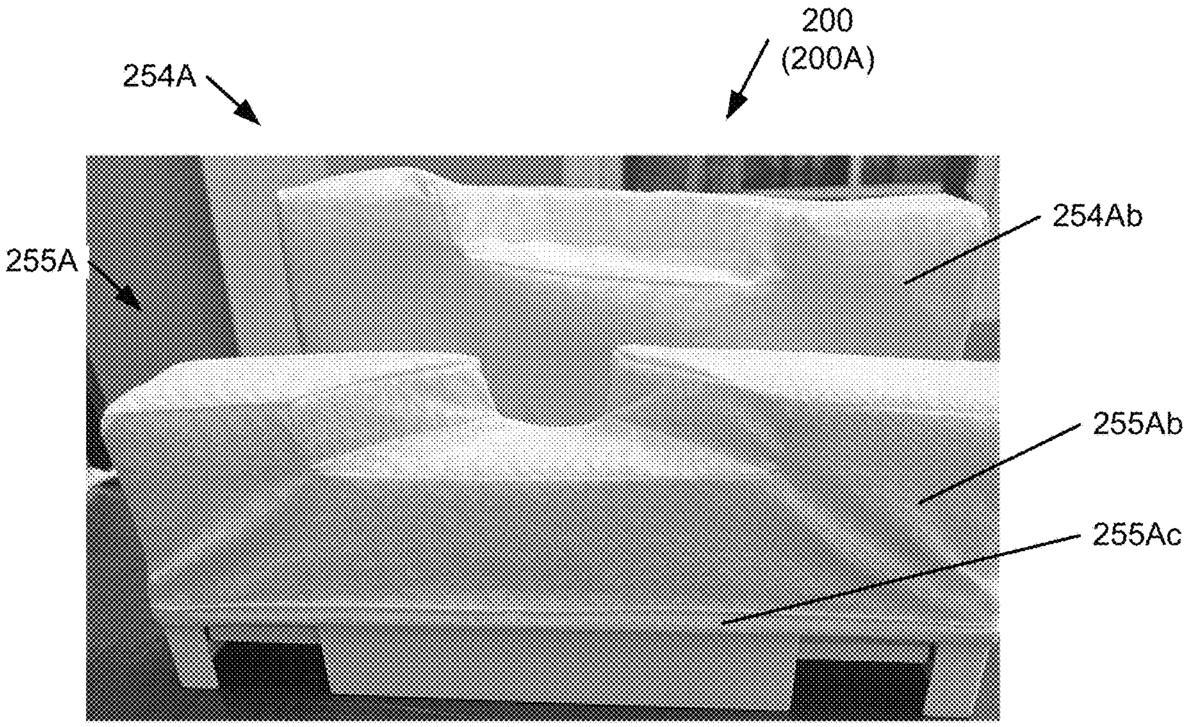
Figure 9M:
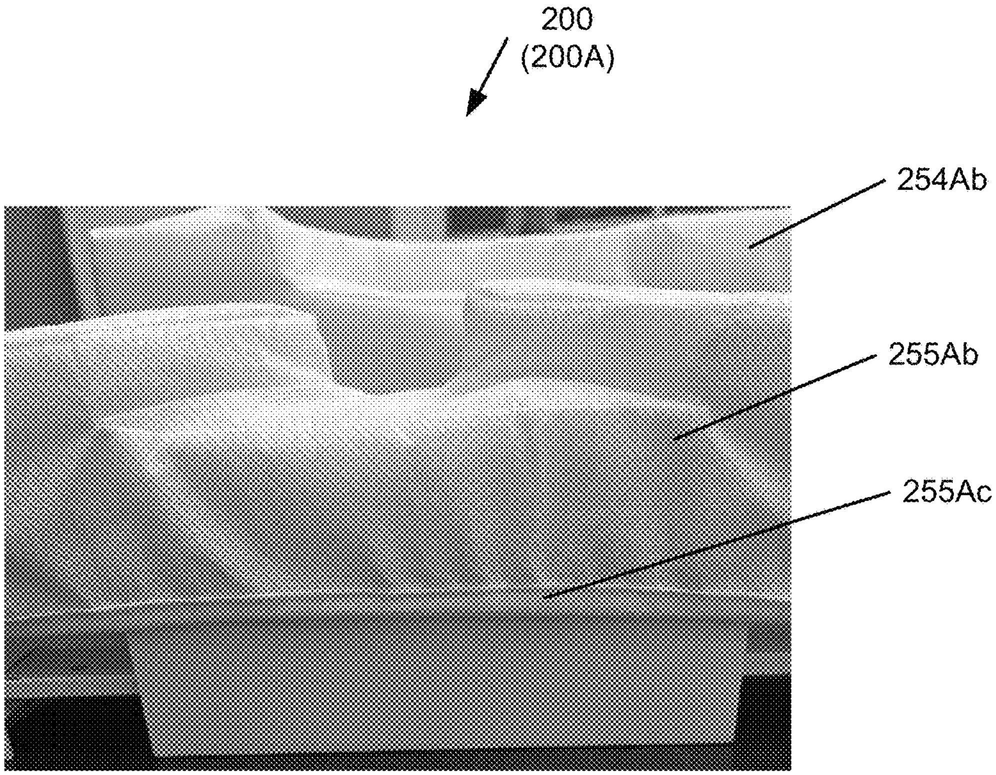

For example, as shown in FIGS. 9E and 9F, in some implementations, the head and neck cradle 200A comprises an upper platform 210A, a middle platform (or middle portion) 220A, a lower platform 230A, and a pad 250A that are generally the same or similar respectively to the above-described upper platform 210, middle platform (or middle portion) 220, lower platform 230, and pad 250 of the head and neck cradle 200 of FIGS. 8A-8G.

FIGS. 10A-10L illustrate an example use of the head and neck cradle 200 (200A) according to the present disclosure. In some implementations, the use of the head and neck cradle 200A shown in FIGS. 10A-10L is the same or similar to the use of the head and neck cradle 100 described above for FIG. 3.

For example, as shown in FIGS. 10A-10D, in some implementations, the head and neck cradle 200A is configured such that the lower platform 230A can be placed under any suitable mattress of any suitable bed (herein, a "hospital bed mattress") 10. In some implementations, the head and neck cradle 200A is configured to thereby permit the upper platform 210A to rest adjacent to the end of the hospital bed mattress 10 for resting a patient's head on the upper platform 210A.

In this way, as shown in FIGS. 10E-10L, in some implementations, a portion of a patient's face and any equipment extending from the patient's face can be positioned through the openings 212A, 213A of the upper platform 210A when using the head and neck cradle 200A. Furthermore, in some implementations, a portion of the patient's face and any equipment extending from the patient's face can be positioned adjacent to the pad 250A, such as between the head pad 254A and the chin/neck pad 255A.

FIGS. 11A-11E illustrate another implementation of an example head and neck cradle 300 according to the present disclosure. In some implementations, the head and neck cradle 300 is the same or similar to the head and neck cradle 100C described above for FIGS. 6A-6D, except as described below.

Figure 11A:
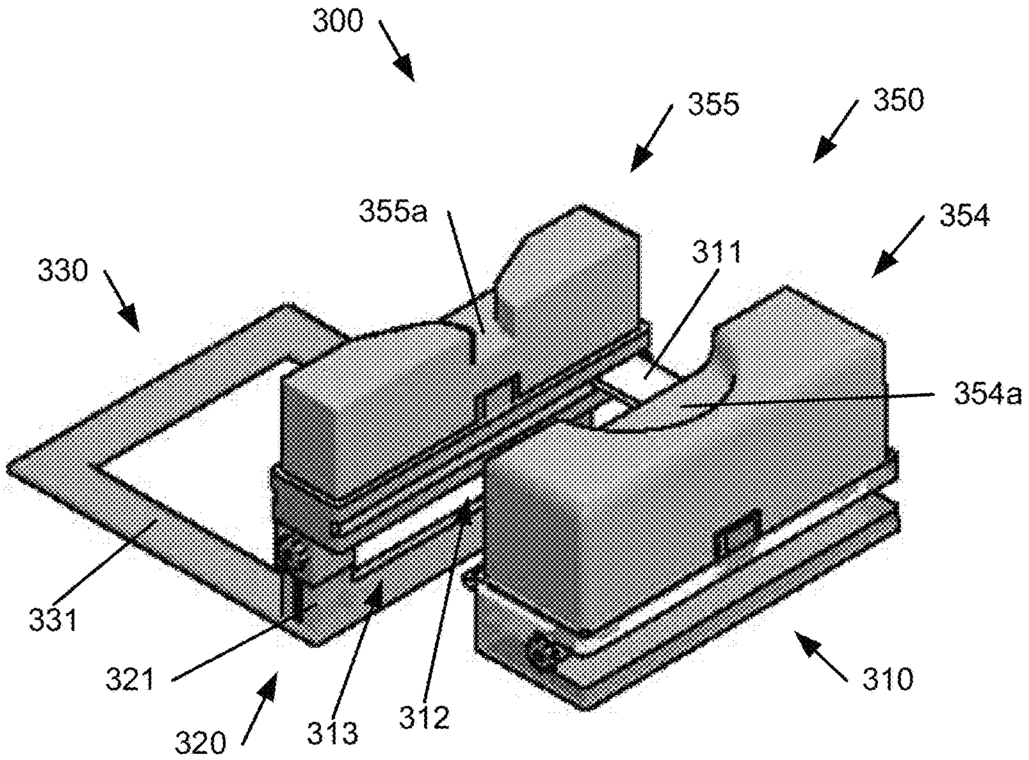
Figure 11B:
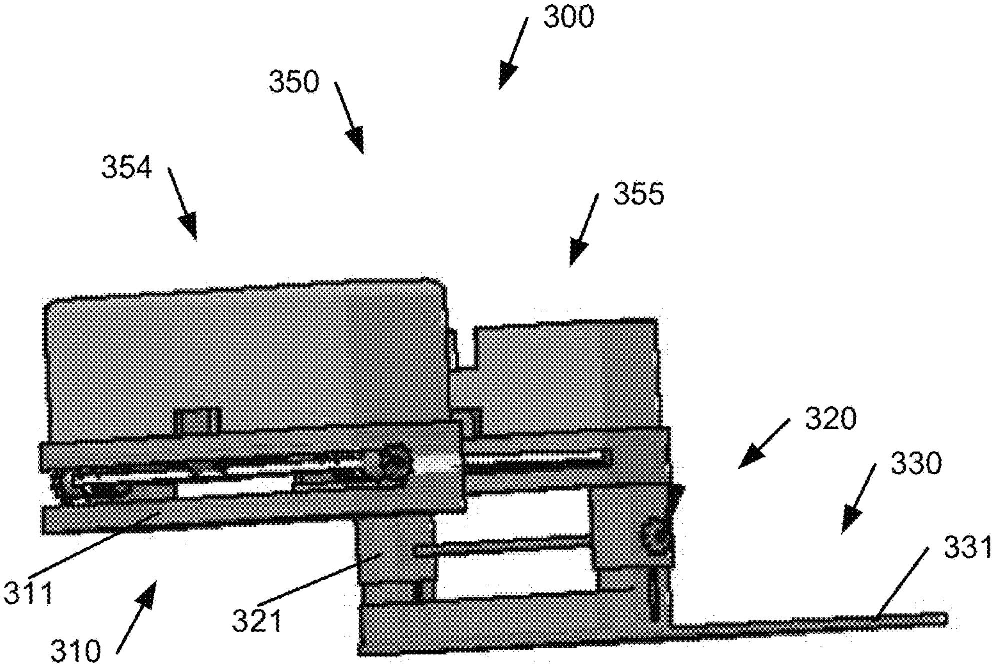

For example, as shown in FIGS. 11A and 11B, in some implementations, the head and neck cradle 300 comprises an upper platform 310, a middle platform (or middle portion) 320, a lower platform 330, and a pad 350 that are generally the same or similar respectively to the above-described upper platform 110C, middle platform (or middle portion) 120C, lower platform 130C, and pad 150C of the head and neck cradle 100C of FIGS. 6A-6D.

Figure 11D:
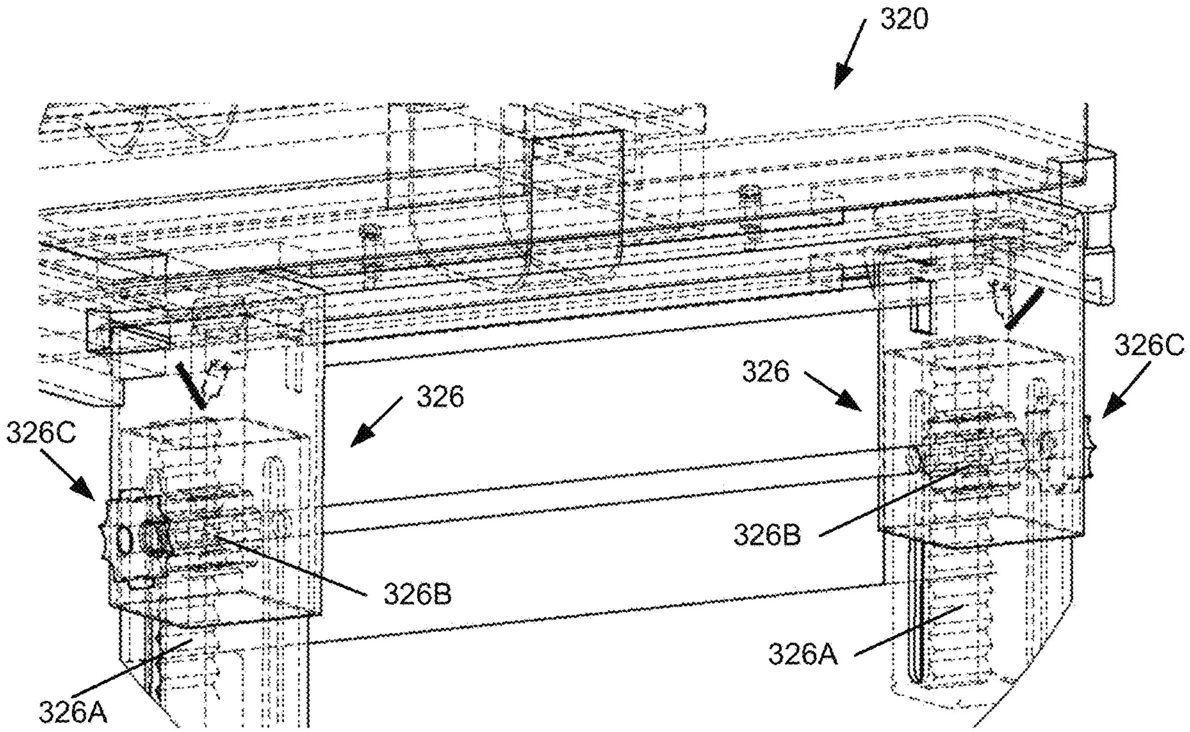
Figure 11D:
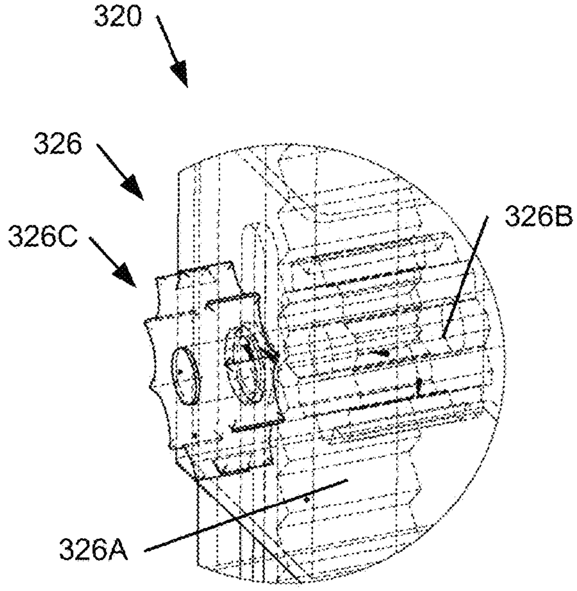
Figure 11E:
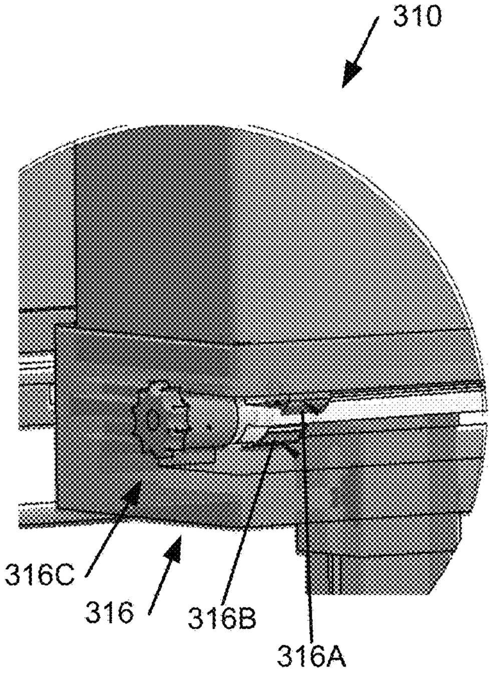

As shown in FIGS. 11C-11E, in some implementations, the middle portion 320 and/or the upper platform 310 further comprise rack and pinion geared adjustment mechanisms 326, 316. That, in some implementations, the middle portion 320 and/or the upper platform 310 further comprise adjustment mechanisms 326, 316 that comprise rack (or linear) 326*a*, 316*a* and pinion (or circular) 326*b*, 316*b* gear engagements to translate circular motion to linear motion.

As shown in FIGS. 11C-11E, in some implementations, the middle portion 320 and/or the upper platform 310 further comprise adjustment handles or knobs 326*c*, 316*c* that are attached to the pinion gears 326*b*, 316*b*. In some implementations, the handles 326*c*, 316*c* are configured to allow a user to turn or rotate the pinion gears 326*b*, 316*b* by turning or rotating the handles 326*c*, 316*c*. In this way, in some implementations, the rack gears 326*c*, 316*c* can be moved linearly by turning or rotating the handles 326*c*, 316*c*.

As shown in FIGS. 11C-11E, in some implementations, the rack gears 326*c*, 316*c* are attached to the middle portion 320 and/or the upper platform 310 respectively. In some implementations, the rack gears 326*c*, 316*c* are attached such that the linear movement of the rack gears 326*c*, 316*c* causes the adjusting movement of the middle portion 320 and/or the upper platform 310 respectively. In some implementations, the adjusting movement may be vertical, horizontal, and/or any other suitable direction.

For example, in some implementations, the middle portion adjustment mechanism 326 is configured to vertically adjust the height or length of the middle portion 320 when the handle 326*c* is turned. In some implementations, the upper platform adjustment mechanism 316 is configured to horizontally adjust the length or position of the upper platform 310, such as the position of the head pad 354 and/or the chin/neck pad 355, when the handle 316*c* is turned.

In some implementations, the 326, 316 are configured to allow adjustment of the platforms 320, 310 while a patient is positioned on the head and neck cradle 300.

One skilled in the art will understand the use of rack and pinion gear engagements for the adjustment mechanisms 326, 316 in light of the disclosure herein.

As shown in FIG. 11C, in some implementations, the members 331 of the lower platform 330 may be further configured to form a four-sided square or rectangular shaped platform.

As shown in FIGS. 11A and 11B, in some implementations, the pad 350 is the same or similar to the pad 250 of the head and neck cradle 200 described above for FIGS. 8A-8G, as indicated by like-numbered and/or like-named features. For example, in some implementations, the pad 350 comprises a head pad 354 and a chin/neck pad 355 configured to separately attach to the upper platform 310. In some implementations, the pad 350 further comprises cutout portions 354*a*, 355*a* configured to comfortably receive a portion of a patient's head and neck respectively.

In some implementations, the pad 350 may further comprise pad covers for a patient's head and neck to position on, such as for sanitary, comfort, etc, purposes.

In some implementations, the head and neck cradle 100, 200, 300 comprises any suitable dimensions, such as the example dimensions show in the figures.

In some implementations, the head and neck cradle 100, 200, 300 is composed of any suitable materials. For example, in some implementations, the members 111, 211, 311, 121, 221, 321, 131, 231, 331 and/or other suitable components of the head and neck cradle 100, 200, 300 may be composed of a rigid material such as a metal, plastic, or wood material.

In some implementations, the pad 150, 250, 350 may be composed of a supportive and comforting material for a patient's head, such as a foam material. In some implementations, the foam material may be a closed-cell medium density foam material or any other suitable foam material.

In some implementations, the head and neck cradle 100, 200, 300 can have any suitable appearance, such as shown in the figures.

In some implementations, an example method of using the head and neck cradle 100, 200, 300, with respect to the above-described figures, comprises placing the lower platform 130, 230, 330 under a hospital bed mattress 10 such that the upper platform 110, 210, 310 rests adjacent to the end of the mattress 10 and extends away from the hospital bed, such as shown in FIGS. 3 and 10A-10D.

In some implementations, the height of the middle portion 120, 220, 320 is adjusted such that the upper platform 110, 210, 310 is below the top of the hospital bed mattress 10, such as shown in FIGS. 3 and 10A-10D. In some implementations, the height of the middle portion 120, 220, 320 may be adjusted such that the upper platform 110, 210, 310 is in any other suitable position.

In some implementations, the method may further comprise adjusting the horizontal position of the pad 350 (e.g., the head pad 354 and/or the chin/neck pad 355), e.g. to better fit and/or support a patient's head, by adjustment of the upper platform 310.

In some implementations, the method may further comprise placing the pad 150 on top of the upper platform 110 such that the openings 152, 153 of the pad 150 are aligned respectively with the openings 112, 113 of the upper platform 110, such as shown in FIG. 2E.

In some implementations, the method may further comprise placing the pad 150, 250, 350 on top of the upper platform 110, 210, 310 such that a patient's face can be positioned and/or rested on the pad 150, 250, 350 with the patient's face positioned within the middle opening 112, 212, 312 and/or adjacent to the side opening 113, 213, 313.

In some implementations, the method comprises placing a patient in a prone position on the hospital bed mattress 10 with the patient's head placed on the upper platform 110, 210, 310. In some implementations, the patient's head is placed on the pad 150, 250, 350 that is positioned on the upper platform 110, 210, 310, such as shown in FIGS. 3 and 10E-10L.

In some implementations, the patient's head is placed on the upper platform 110, 210, 310 and/or the pad 150, 250, 350 such that a portion of the patient's face can be observed through the opening 112, 152, 212, 312 through the middle of the upper platform 110, 210, 310 and the pad 150 respectively, such as shown in FIGS. 3 and 10E-10L. In this way, in some implementations, the patient can be monitored in the prone position with less or no difficulty and the patient can be kept in the prone position while reducing or preventing facial bruising or similar harm.

In some implementations, any tubes (such as for ventilation) and/or other equipment extending from the patient are positioned through the opening 113, 153, 213, 313 through the side of the upper platform 110, 210, 310 and the pad 150 respectively. In this way, in some implementations, the patient can be accessed in the prone position for treatment and the patient can be kept in the prone position while reducing or preventing endotracheal tube displacement such as accidental extubation.

In some implementations, the method may further comprise moving the side opening 313 from one side of the upper platform 310 to the other by detaching the upper platform 210 from the middle portion 220, flipping over the upper platform 210, and reattaching the upper platform 210 to the middle portion 220, such as shown in FIGS. 8A, 8B, 8E, and 8F.

The figures, including photographs and drawings, comprised herewith may represent one or more implementations of the head and neck cradle.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. An apparatus comprising:

an upper portion;

a lower portion; and middle portion, wherein:

the upper portion extends lengthwise and widthwise and comprises at least a first flat horizontal surface extending lengthwise, a second flat horizontal surface extending lengthwise, and a side portion extending widthwise between the first flat horizontal surface and the second flat horizontal surface on a first side of the upper portion;

the first flat horizontal surface and the second flat horizontal surface are parallel to each other and separated from each other thereby defining a center opening between the first flat horizontal surface and the second flat horizontal surface, the upper portion further comprising a pad or padding attached to the first flat horizontal surface and a pad or padding attached to the second flat horizontal surface;

the side portion extends widthwise in a direction away from the middle portion;

a second side of the upper portion opposite the first side of the upper portion comprises a side opening accessible to the center opening;

the lower portion comprises at least one portion extending away from the middle portion in a direction opposite the side portion in the upper portion; and the middle portion extends between the upper portion and the lower portion.

2. The apparatus of claim 1 wherein the length of the middle portion is adjustable such that a distance between the upper portion and the lower portion is adjustable.

3. The apparatus of claim 1 wherein the first flat horizontal surface is moveable along the side portion to adjust a distance between the first flat horizontal surface and the second flat horizontal surface.

4. A system comprising a ventilator having one or more tubes extending therefrom;

a bed having a mattress; and the apparatus of claim 1 wherein, the lower portion of the apparatus of claim 1 is positioned under the mattress such that the upper portion of the apparatus of claim 1 is positioned adjacent to the end of the mattress; and the one or more tubes extending from the ventilator are positioned through the side opening of the apparatus of claim 1.

5. A method of using the system of claim 4 comprising:

placing the lower portion of the apparatus under a mattress such that the upper portion of the apparatus rests adjacent the end of the mattress and extends away from the mattress;

placing a person in a prone position and placing a portion of a person's head on the pad or padding such that a portion of the person's face may be observed through the center opening; and extending at least one tube extending from the person through the side opening of the apparatus to medical equipment.

6. A method of using the apparatus of claim 1 comprising:

placing the lower portion of the apparatus under a mattress such that the upper portion of the apparatus rests adjacent the end of the mattress and extends away from the mattress;

placing a person in a prone position and placing a portion of a person's head on the pad or padding such that a portion of the person's face may be observed through the center opening; and extending at least one tube extending from the person through the side opening of the apparatus.

7. The method of claim 6 further comprising moving the first flat horizontal surface along the side portion to adjust a distance between the first flat horizontal surface and the second flat horizontal surface.

8. The method of claim 6 further comprising adjusting the height of the middle portion.

9. An apparatus comprising:

an upper portion;

a lower portion; and middle portion, wherein:

the upper portion extends lengthwise and widthwise and comprises at least a first flat horizontal surface extending lengthwise, a second flat horizontal surface extending lengthwise, and a side portion extending widthwise between the first flat horizontal surface and the second flat horizontal surface on a first side of the upper portion;

the first flat horizontal surface and the second flat horizontal surface are parallel to each other and separated from each other thereby defining a center opening between the first flat horizontal surface and the second flat horizontal surface and wherein the first flat horizontal surface is moveable along the side portion to adjust a distance between the first flat horizontal surface and the second flat horizontal surface, the upper portion further comprising a pad or padding attached to the first flat horizontal surface and a pad or padding attached to the second flat horizontal surface;

the side portion extends widthwise in a direction away from the middle portion;

a second side of the upper portion opposite the first side of the upper portion comprises a side opening accessible to the center opening;

the lower portion comprises at one portion extending away from the middle portion in a direction opposite the side portion in the upper portion; and the middle portion extends between the upper portion and the lower portion wherein the length of the middle portion is adjustable such that a distance between the upper portion and the lower portion is adjustable.

* * * * *